(12) United States Patent  
Polland

(10) Patent No.: US 8,116,320 B2
(45) Date of Patent: Feb. 14, 2012

(54) MAPPING EXTERNAL PORT USING VIRTUAL LOCAL AREA NETWORK

(75) Inventor: Joe Polland, Raleigh, NC (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 636 days.

(21) Appl. No.: 11/462,782

(22) Filed: Aug. 7, 2006

(65) Prior Publication Data

US 2008/0031260 A1 Feb. 7, 2008

(51) Int. Cl.
*H04L 12/28* (2006.01)
(52) U.S. Cl. .................... 370/395.53; 370/389
(58) Field of Classification Search .................. 370/389, 370/392, 393, 394, 396, 395.1–395.3, 395.31, 370/395.5, 395.53, 395.7, 401, 409
See application file for complete search history.

(56) References Cited

U.S. PATENT DOCUMENTS

| | | | |
|---|---|---|---|
| 5,892,753 A * | 4/1999 | Badt et al. ..................... | 370/233 |
| 6,202,170 B1 | 3/2001 | Bussschbach et al. | |
| 6,332,198 B1 | 12/2001 | Simons | |
| 6,553,028 B1 | 4/2003 | Tang et al. | |
| 6,590,861 B1 | 7/2003 | Vepa et al. | |
| 7,187,648 B1 | 3/2007 | Rangarajan et al. | |
| 2003/0152075 A1 * | 8/2003 | Hawthorne et al. ........... | 370/389 |
| 2005/0105539 A1 * | 5/2005 | Tzeng ........................... | 370/396 |
| 2005/0147029 A1 | 7/2005 | Gambardella et al. | |
| 2007/0076590 A1 | 4/2007 | Galpin et al. | |
| 2007/0116014 A1 | 5/2007 | Shuen et al. | |

FOREIGN PATENT DOCUMENTS

| | | |
|---|---|---|
| KR | 1020040020727 | 3/2004 |
| KR | 1020040050949 | 6/2004 |

* cited by examiner

*Primary Examiner* — Chi Pham
*Assistant Examiner* — Kouroush Mohebbi
(74) *Attorney, Agent, or Firm* — Fogg & Powers LLC

(57) ABSTRACT

A program product comprising program instructions, embodied on a storage medium that are operable to cause a processor to switch input data packets for ingress to at least one internal-device port of an internal device from all external ports using virtual local area network identifiers and port virtual local area network tags and to switch output data packets for egress from the internal-device ports of the internal device using the virtual local area network identifiers and the port virtual local area network tags. There are more external ports than internal-device ports and applications in the internal device have visibility to all external ports.

39 Claims, 19 Drawing Sheets

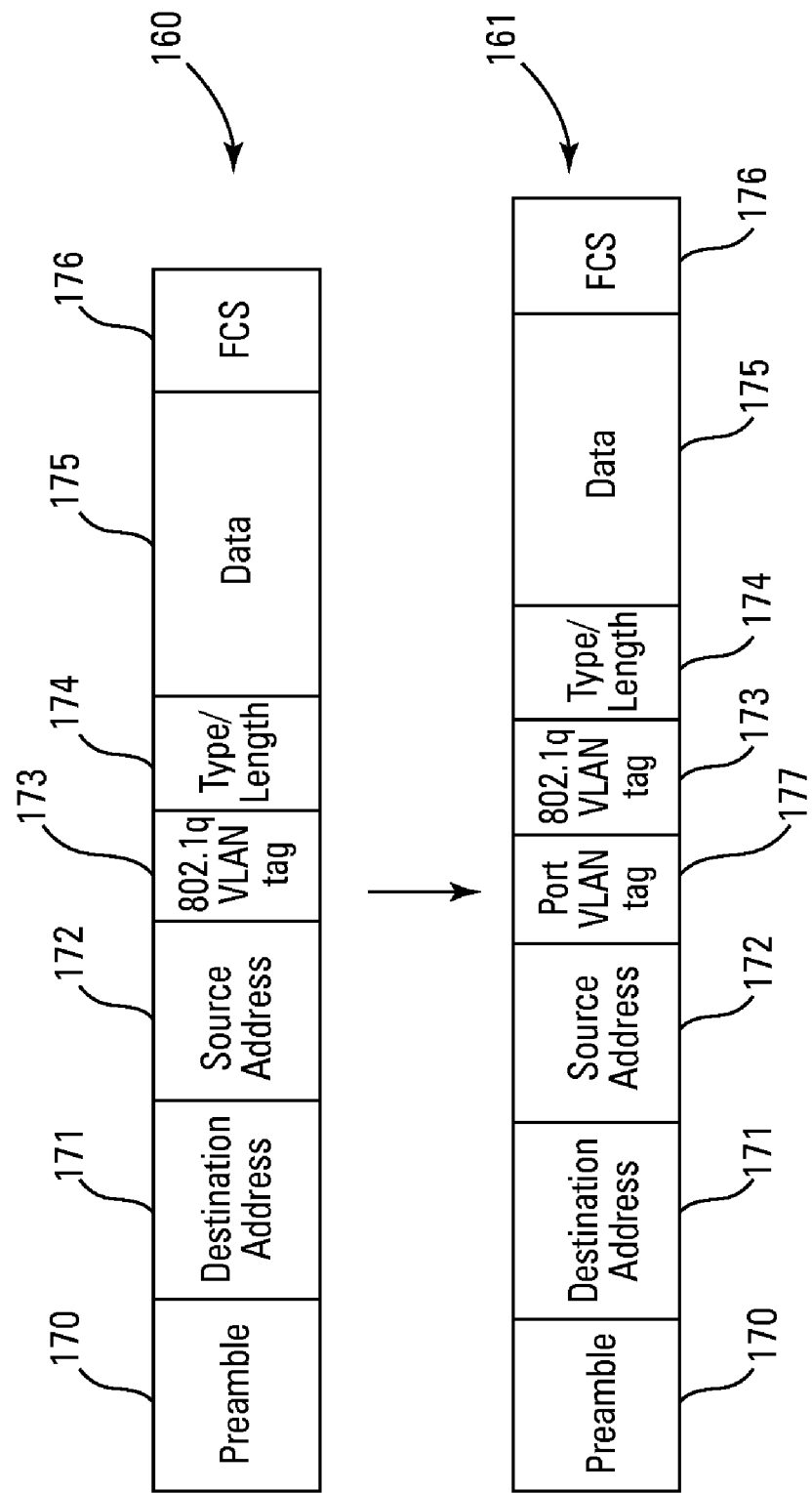

MAPPING EXTERNAL PORT USING VIRTUAL LOCAL AREA NETWORK

BACKGROUND

System designers often face configuration problems when the system incorporates commercial-off-the-shelf (COTS) devices. In some cases, a first COTS device has some number of ports that need to be communicatively coupled with a second COTS device that has a different number of ports. To get around the mismatched number of ports, the system designer has to include additional COTS devices to increase the number of ports on the side of the interface that has too few ports. The addition of extra COTS devices increases the system costs. Likewise, the complexity of whole system increases with the addition of extra COTS devices. Additional software to manage the additional COTS devices has to be written, embedded and tested in the system. Such complex systems cannot be extended in a simple manner. When the port mismatch is resolved by adding another COTS device, there is generally an unused port in the additional COTS device when the system is operational.

It is desirable to increase the available port access for a system device without adding extra COTS devices that are only required to provide an interfacing port. It is further desirable to increase the available port access for a system device in a manner that is easily extendable as the system evolves over time.

SUMMARY

A first aspect of the present invention provides a program product including program instructions embodied on a storage medium that are operable to cause a processor to switch input data packets for ingress to at least one internal-device port of an internal device from all external ports using virtual local area network identifiers and port virtual local area network tags. The program product also comprises program instructions to switch output data packets for egress from the internal-device ports of the internal device using the virtual local area network identifiers and the port virtual local area network tags. There are more external ports than internal-device ports and applications in the internal device have visibility to all external ports.

A second aspect of the present invention provides a connector device including external-coupling ports communicatively coupled with external ports and internal-coupling ports communicatively coupled with internal-device ports. A virtual local area network identifier identifies a paired external-coupling port and internal-coupling port. At least one internal-coupling port is paired with more than one external-coupling port. The connector device also includes a processor and a memory communicatively coupled to the processor. The connector device directs data packets between the internal-coupling ports and the external ports based on the virtual local area network identifier. The memory stores a configuration table associating the virtual local area network identifier with the respective pair of external-coupling ports and internal-coupling ports. The memory also stores a mapping table associating each virtual local area network identifier to one of the external-coupling ports. The processor directs the data packets that are input to the connector device based on the configuration table and the mapping table.

A third aspect of the present invention provides a system including a connector device and an internal device. The connector device has internal-coupling ports. The internal device is communicatively coupled with the internal-coupling ports. Virtual local area network identifiers are used to switch data packets between the internal device and external ports that are communicatively coupled to the connector device. Virtual local area network tags are used to transport port information between the internal device and the external ports.

A fourth aspect of the present invention provides a method to map external ports. The method includes switching input data packets for ingress to all internal-device ports of an internal device from all external ports using virtual local area network identifiers and port virtual local area network tags. The method also includes switching output data packets for egress from all the internal-device ports of the internal device using the virtual local area network identifiers and the port virtual local area network tags. There are more external ports than internal-device ports. The applications in the internal device have visibility to all the external ports.

A fifth aspect of the present invention provides a program product comprising program instructions, embodied on a storage medium, that are operable to cause at least one processor to switch input data packets for ingress to at least one internal-device port of an internal device from all external ports coupled to connector devices and to switch output data packets for egress from the internal-device ports of the internal device. The switching uses virtual local area network identifiers and virtual local area network tags. There are more external ports than internal-device ports and applications in the internal device have visibility to all external ports coupled to the connector devices.

A sixth aspect of the present invention provides a plurality of connector devices. Each connector device includes external-coupling ports communicatively coupled with external ports and internal-coupling ports communicatively coupled with internal-device ports of an internal device. A virtual local area network identifier identifies a paired external-coupling port and internal-coupling port. At least one internal-coupling port is paired with more than one external-coupling port. Each connector device also includes a processor to direct data packets between the internal-coupling ports and the external ports based on the virtual local area network identifier and a memory communicatively coupled to the processor. The memory stores a configuration table associating the virtual local area network identifier with the respective pair of external-coupling ports and internal-coupling ports. The memory also stores a mapping table associating each virtual local area network identifier to one of the external-coupling ports. The processor directs the data packets that are input to the plurality of connector devices to the internal device based on the configuration table and the mapping table.

A seventh aspect of the present invention provides a system including a plurality of connector devices having internal-coupling ports and an internal device communicatively coupled with the internal-coupling ports of the plurality of connector devices. The virtual local area network identifiers are used to switch data packets between the internal device and external ports communicatively coupled to the plurality of connector devices. The virtual local area network tags are used to transport port information between the internal device and the external ports.

An eighth aspect of the present invention provides a method to map external ports. The method includes switching input data packets for ingress to at least one internal-device port of an internal device from all external ports coupled to a plurality of connector devices. The switching uses virtual local area network identifiers and port virtual local area network tags. The method also includes switching output data packets for egress from all the internal-device ports of the internal device using the virtual local area network identifiers and the port virtual local area network tags. There are more external ports than internal-device ports, and applications in the internal device have visibility to all the external ports coupled to the plurality of connector devices.

DRAWINGS

FIGS. 3A and 3B are block diagrams of embodiments of data packets modified for ingress to an internal device.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which are shown by way of illustrating specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
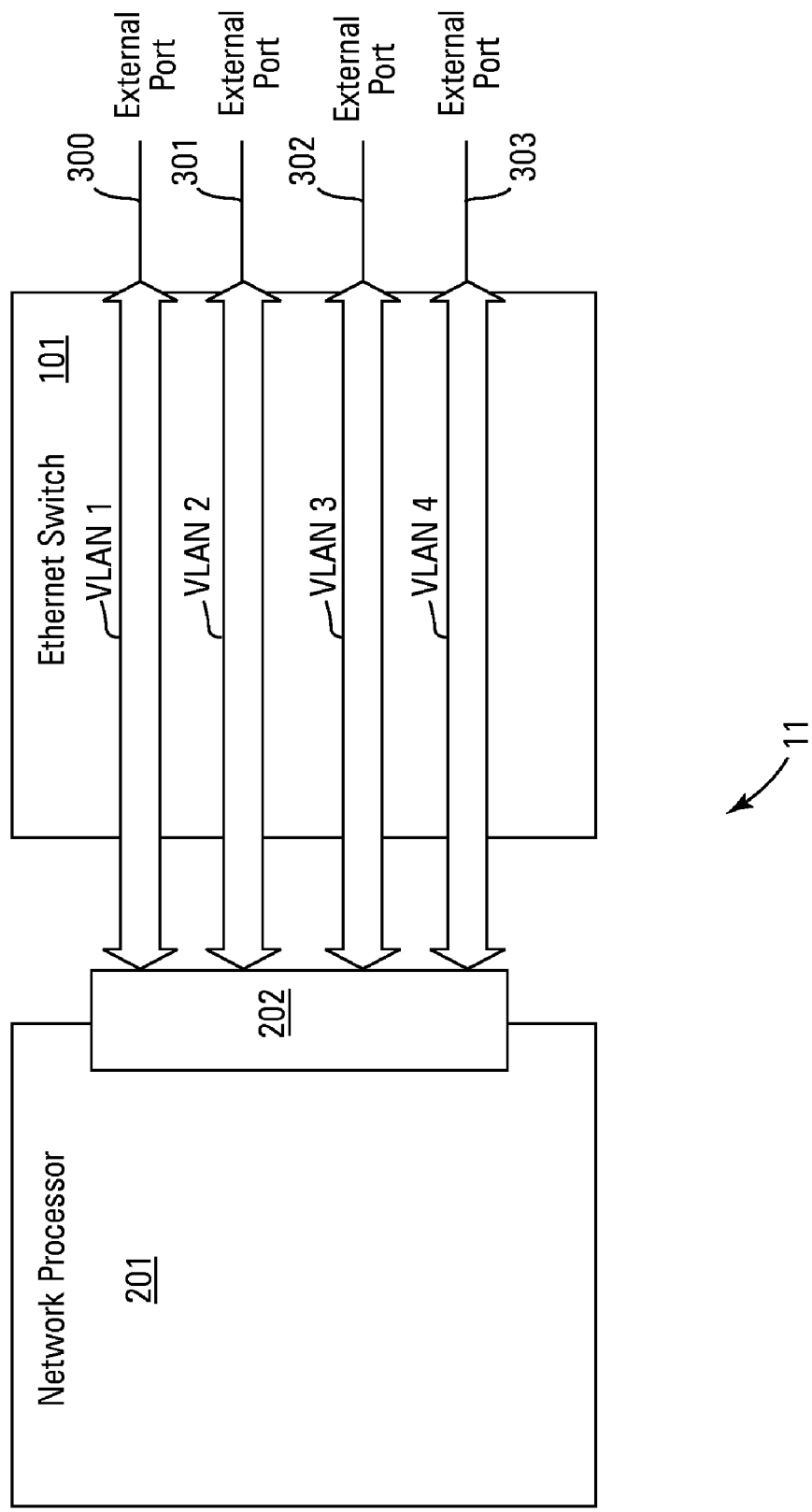
FIG. 1 is a generic block diagram of one embodiment of a system to map external ports to an internal device.

FIG. 1 is a generic block diagram of one embodiment of a system 11 to map external ports 300-303 to an internal device referred to in FIG. 1 as network processor 201. The network processor 201 has one physical port 202 through which communicative signals are transmitted from the four external ports 300-303. The connector device, referred to in FIG. 1 as "Ethernet switch 101," is communicatively coupled to the four ports 300, 301, 302, and 303 via a virtual communicative pathway generally indicated as VLAN-1, VLAN-2, VLAN-3, and VLAN-4, respectively. VLAN is an acronym for virtual local area network. The VLAN-n is shown here as a double block arrow and represents a virtual wire or communicative pathway that is created by reconfiguring the Ethernet switch 101 responsive to software in the Ethernet switch 101. The software in the Ethernet switch 101 switches data packets that are configured according to the format of the Institute of Electrical and Electronics Engineers (IEEE) 802.1 and 802.3 standards.

Figure 2:
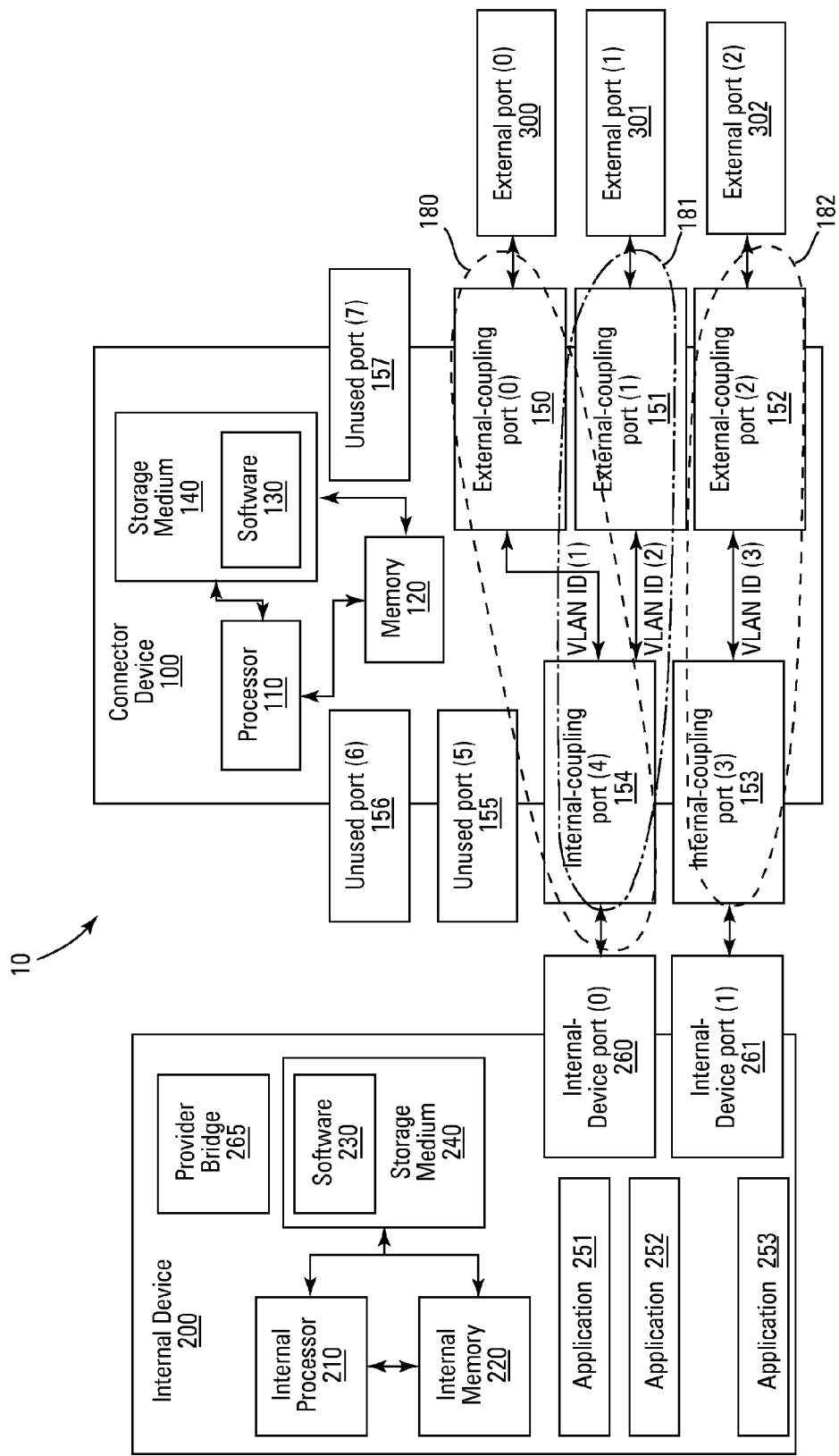
FIG. 2 is a block diagram of another embodiment of a system to map external ports to an internal device.

FIG. 2 is a block diagram of one embodiment of a system 10 to map external ports 300-302 to an internal device 200. The system 10 includes a connector device 100 and an internal device 200. The connector device 100 includes internal-coupling ports 154 and 153 that are communicatively coupled to the internal device 200.

The internal device 200 includes internal-device ports 260 and 261, an internal processor 210, an internal memory 220, a storage medium 240 including software 230, a provider bridge 265, and applications 251, 252 and 253. The internal memory 220 is communicatively coupled to the internal processor 210 and to the storage medium 240. The internal processor 210 is also communicatively coupled to the storage medium 240.

The internal memory 220 stores an internal configuration table associating the internal-device ports 260 and 261 with at least one of the virtual local area network identifiers (VLAN ID (n)), which are shown in the connector device 100 as VLAN ID (1), VLAN ID (2), and VLAN ID (3). As shown in FIG. 2, the internal-device ports 260 and 261 each have an internal-device port identifier (shown in parenthesis in FIG. 2). The internal-device port identifier is correlated to the VLAN ID in the internal mapping table stored in the internal memory 220. TABLE 1 shows the internal mapping table for the internal device 200 as it is being implemented in FIG. 2. The generation of TABLE 1 depends on the type of internal device 200 and connector device 100.

TABLE 1

| VLAN Identifier | Internal-Device Port Identifier |
| --- | --- |
| 1 | 0 |
| 2 | 0 |
| 3 | 1 |

In one implementation of this embodiment, the provider bridge 265 is not included in the internal device 200.

The connector device 100 includes ports 150-157, a processor 110, a memory 120, and a storage medium 140 including software 130. The ports 150-157 in the connector device 100 as implemented in FIG. 2 comprise internal-coupling ports 153 and 154, external coupling ports 150, 151 and 152 and unused ports 155, 156 and 157. The external-coupling ports 150, 151 and 152 are communicatively coupled with respective external ports 300, 301 and 302. The internal-coupling ports 154 and 153 are communicatively coupled with respective internal-device ports 260 and 261 of the internal device 200. The unused ports 155, 156 and 157 are not connected to either an internal-device port or an external port. If at a later time an unused port 155, 156 and 157 is communicatively coupled to an internal-device port, that unused port is redefined as an internal-coupling port. Likewise, if at a later time an unused port 155, 156 and 157 is communicatively coupled to an external port, that unused port is redefined as an external-coupling port.

A virtual local area network identifier identifies a paired external-coupling port and internal-coupling port. In the connector device 100, there is always at least one internal-coupling port paired with more than one external-coupling port. As shown in FIG. 1, the external-coupling port 150 and the external-coupling port 151 are both paired with internal-coupling port 154. The pairing of the external-coupling port 150 with internal-coupling port 154 is generally indicated as paired external-coupling port and internal-coupling port 180 and is also referred to here as "paired ports 180." The pairing of the external-coupling port 151 with internal-coupling port 154 is generally indicated as paired external-coupling port and internal-coupling port 181 and is also referred to here as "paired ports 181." As is also shown in FIG. 1, the external-coupling port 152 is paired with internal-coupling port 153. This pairing is generally indicated as paired external-coupling port and internal-coupling port 182 and is also referred to here as "paired ports 182."

The memory 120 stores a configuration table that associates the virtual local area network identifier (VLAN ID (n)) with the respective pair of external-coupling ports and internal-coupling ports 180, 181 and 182. The memory 120 also stores a mapping table that associates each virtual local area network identifier to one of the external-coupling ports 300-303.

As shown in FIG. 2, the ports 150-157 and 300-303 each have a numerical identifier shown in parenthesis. The numerical identifiers for ports 150-157 and 300-303 are included in the mapping tables and configuration tables stored in memory 120. In this exemplary embodiment, external-coupling port 150 has numerical identifier 0, external-coupling port 151 has numerical identifier 1, external-coupling port 152 has numerical identifier 2, internal-coupling port 153 has numerical identifier 3, and so forth.

The memory 120 is communicatively coupled to the processor 110 and the storage medium 140. The processor 110 is also communicatively coupled to the storage medium 140. The processor 110 directs data packets, which are input to the connector device 100, between the internal-coupling ports 153 and 154 and the external ports 150, 151, and 152 based on the virtual local area network identifier in the data packet. The directing is based on the configuration table and the mapping table.

The configuration table stored in memory 120 for the connector device 100, as it is being implemented in FIG. 2, is shown in TABLE 2. The VLAN identifier (ID) is correlated to the identifiers for the paired external-coupling ports and the internal-coupling port as is shown in the configuration table (TABLE 2).

TABLE 2

| VLAN Identifier (ID) | External-Coupling Port Identifier | Internal-Coupling Port Identifier |
|---|---|---|
| 1 | 0 | 4 |
| 2 | 1 | 4 |
| 3 | 2 | 3 |

The mapping table stored in memory 120 for the connector device 100, as it is being implemented in FIG. 2, is shown in TABLE 3. The VLAN identifier (ID) is shown in the mapping table (TABLE 3) for each external port identifier.

TABLE 3

| VLAN Identifier (ID) | External Port Identifier |
|---|---|
| 1 | 0 |
| 2 | 1 |
| 3 | 2 |

In one implementation, the internal device 200 is a master device. The internal device 200 assigns the VLAN identifiers and creates, configures the maps, and generates the tables used in the connector device 100. The internal device 200 downloads Tables 2 and 3 to the connector device 100. When a user sends reconfiguration instructions to the internal device 200 to change the port configuration, the internal device 200 reassigns the VLAN identifiers, recreates the tables and downloads the modified tables to the connector device 100.

Figure 3B:
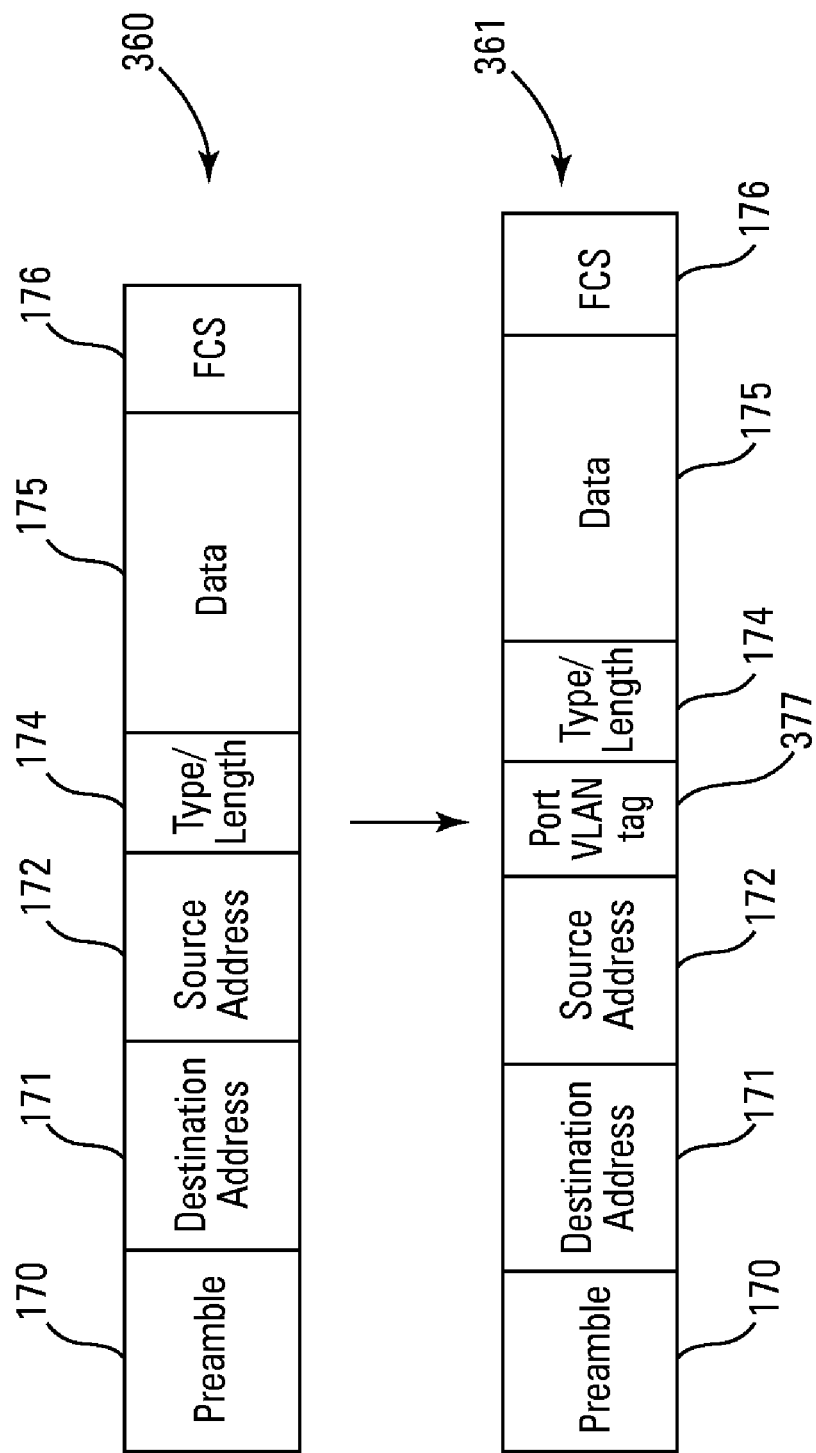

The virtual local area network identifiers assigned to a VLAN tag in the data packet are used to switch data packets between the internal device 200 and external ports 300-302 that are communicatively coupled to the connector device 100. FIGS. 3A and 3B are block diagrams of embodiments of data packets modified for ingress to an internal device.

FIG. 3A is a block diagram of an embodiment of a data packet 161 modified for ingress to an internal device 200 via the connector device 100. The exemplary data packet 160 is a data packet that is being transmitted in a communication network (not shown) that includes the internal device 200 and the connector device 100. The data packet 160 shown in FIG. 3A is being transmitted according to the standards set by the Institute of Electrical and Electronics Engineers (IEEE) committee to develop Standards for Local and Metropolitan Area Networks Virtual Bridged Local Area Networks in the 802.1Q VLAN specification. Thus, the format of data packet 160 conforms to the standards set by the Institute of Electrical and Electronics Engineers (IEEE) committee to develop Standards for Local and Metropolitan Area Networks Virtual Bridged Local Area Networks in the 802.1Q VLAN specification.

Data packet 160 includes the preamble field 170, the destination address field 171, the source address field 172, the 802.1Q VLAN tag 173, the type field/length 174, the data field 175, and the frame check sequence (FCS) field. The 802.1Q VLAN tag 173 includes the tag protocol identifier followed by two octets of tag control information. The two octets of tag control information consist of three fields. The first field includes three bits which indicate the user priority. The second field includes a one bit canonical format identifier (CFI). The remaining twelve bits are a network-based virtual local area network identifier that is required for the data packet 160 to be transmitted through the communication network.

In order to switch data packet 160 between the internal device 200 and external ports 300-302 that are communicatively coupled to the connector device 100, the data packet 160 is configured with an additional VLAN tag. Thus, the data packet 160 is modified to form data packet 161 by the inclusion of a VLAN tag 177, between the source address field 172 and the 802.1Q VLAN tag 173. The term "VLAN tag" is also referred to here as "port VLAN tag." When the data packet 161 is received at the internal processor 210, the data packet 161 is modified back to the format of data packet 160 for input to an application 251, 252 or 251

The port VLAN tag 177 contains information indicative of the virtual local area network identifier (VLAN ID) and is configured according to the IEEE 802.1Q standards. Specifically, the port VLAN tag 177 includes the tag protocol identifier followed by two octets of tag control information. The port VLAN tag 177 is configured in the same manner as the 802.1Q VLAN tag 173 and includes two octets of tag control information that consist of three fields. The first field includes three bits which indicate the user priority. In one implementation of this embodiment, the user priority is set to "0." The second field includes a one bit canonical format identifier (CFI). In one implementation of this embodiment, the CFI is set to "0." The remaining twelve bits are the VLAN identifier that is indicated as VLAN ID (n) in FIG. 2. This format is conformant with the standards set by the Institute of Electrical and Electronics Engineers (IEEE) committee to develop Standards for Local and Metropolitan Area Networks Virtual Bridged Local Area Networks in the 802.1Q VLAN specification.

The process by which the port VLAN tag 177 is inserted between the source address field 172 and the 802.1Q VLAN tag 173 of the data packet 160 is described below with reference to block 804 of method 800 in FIG. 8. In one implementation of this embodiment, the exemplary data packet does not include the 802.1Q VLAN tag 173. In this case, the data packet is configured in a manner that enables the addition of a VLAN tag for switching in the connector device 100.

In one implementation of this embodiment, the data packet 160 is an Ethernet frame configured according to 802.1Q standards and the data packet 161 is an Ethernet frame modified to include an additional VLAN tag. In one implementation of this embodiment, the exemplary data packet is configured according to the IEEE 802.3-2002 standards for Ethernet frames without virtual local area network tags.

FIG. 3B is a block diagram of an embodiment of a data packet 361 modified for ingress to an internal device 200 via the connector device 100. In this implementation of the embodiment, the data packet 360 is an Ethernet frame configured according to IEEE 802.3-2002 standards without virtual local area network tags. The data packet 361 is an Ethernet frame modified to include an additional a port VLAN tag 377. The exemplary data packet 360 is a data packet that is being transmitted in a communication network (not shown) that includes the internal device 200 and the connector device 100.

Data packet 360 is similar to data packet 160 except there is no 802.1Q VLAN tag 173. In order to switch data packet 360 between the internal device 200 and external ports 300-302 that are communicatively coupled to the connector device 100, the data packet 361 is configured with port VLAN tag 377, between the source address field 172 and the type field/length 174. When the data packet 361 is received at the internal processor 210, the data packet 361 is modified back to the format of data packet 360 for input to an application 251, 252 or 251

The port VLAN tag 377 contains information indicative of the virtual local area network identifier (VLAN ID) and is configured according to the IEEE 802.1Q standards. Specifically, the port VLAN tag 377 includes the tag protocol identifier followed by two octets of tag control information. The port VLAN tag 377 includes two octets of tag control information that consist of three fields. The first field includes three bits which indicate the user priority. In one implementation of this embodiment, the user priority is set to "0." The second field includes a one bit canonical format identifier (CFI). In one implementation of this embodiment, the CFI is set to "0." The remaining twelve bits are the VLAN identifier that is indicated as VLAN ID (n) in FIG. 2. This format is conformant with the standards set by the Institute of Electrical and Electronics Engineers (IEEE) committee to develop Standards for Local and Metropolitan Area Networks Virtual Bridged Local Area Networks in the 802.1Q VLAN specification.

The process by which the port VLAN tag 377 is inserted between the source address field 172 and the 802.1Q VLAN tag 173 of the data packet 360 is described below with reference to block 804 of method 800 in FIG. 8. In one implementation of this embodiment, the exemplary data packet does not include the 802.1Q VLAN tag 173. In this case, the data packet is configured in a manner that enables the addition of a VLAN tag for switching in the connector device 100.

Figure 4:
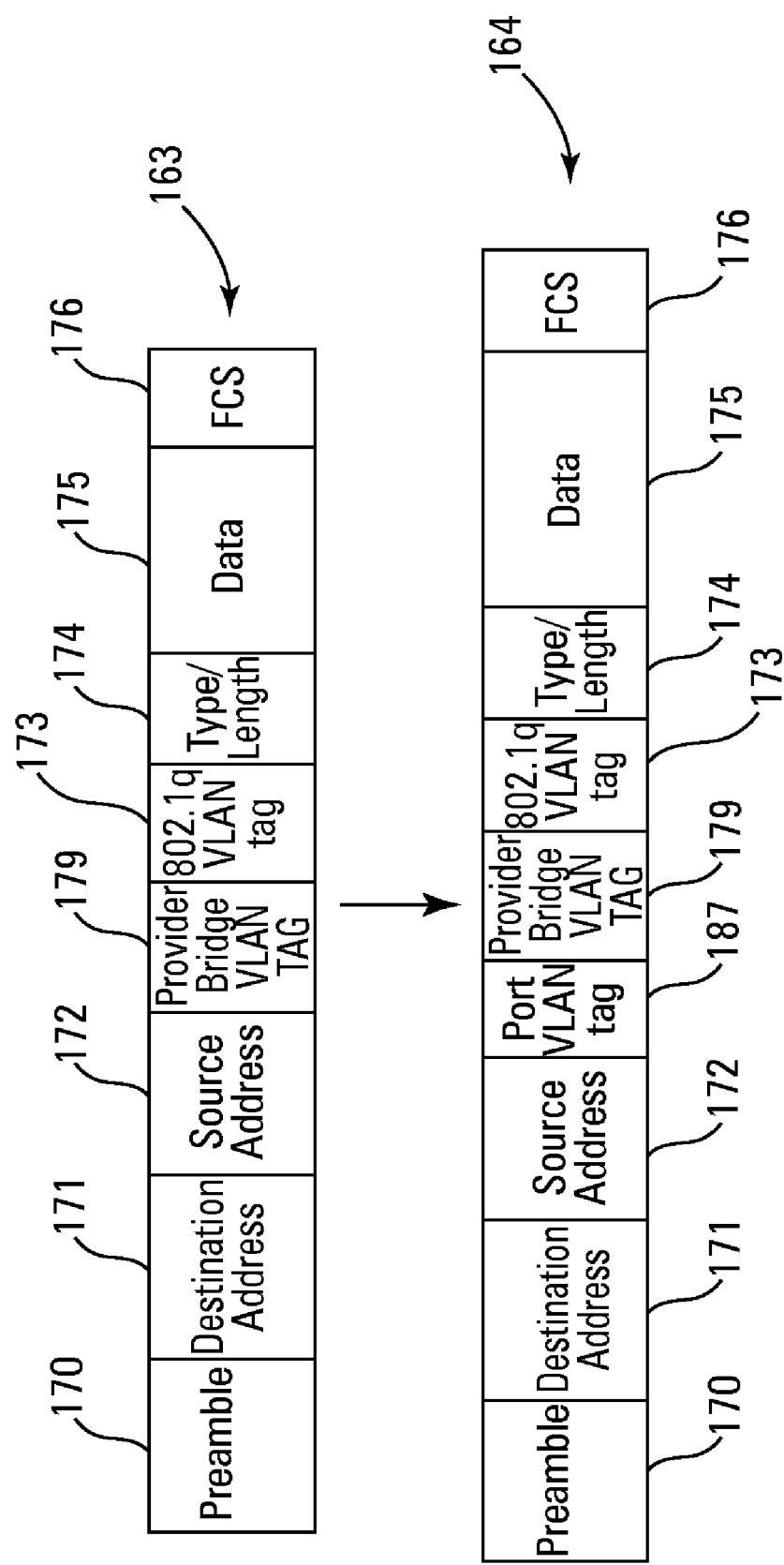
FIG. 4 is a block diagram of an embodiment of a data packet modified for ingress to a provider bridge.

In some implementations, the internal device 200 includes a provider bridge 265, as shown in FIG. 2, and the data packet received at the internal device 200 includes a provider bridge VLAN tag 179 that is configured according to the IEEE 802.1AD standards. FIG. 4 is a block diagram of an embodiment of a data packet 164 modified for ingress to a provider bridge 265 in the internal device 200 via the connector device 100.

The data packet 163 shown in FIG. 4 is being transmitted according to the standards set by the IEEE committee to develop 802.1AD VLAN specification. Thus, the format of data packet 163 conforms to the standards set by the IEEE 802.1AD VLAN specification.

Data packet 163 includes the preamble field 170, the destination address field 171, the source address field 172, a provider bridge VLAN tag 179, the 802.1Q VLAN tag 173, the type field/length 174, the data field 175, and the frame check sequence (FCS) field. The 802.1Q VLAN tag 173 is formatted as described above with reference to FIG. 3A.

In order to switch data packet 163 between the internal device 200 and external ports 300-302 that are communicatively coupled to the connector device 100, the data packet 163 is configured with an additional VLAN tag. Thus, the data packet 163 is modified to form data packet 164 by the inclusion of a port VLAN tag 187, between the source address field 172 and the provider bridge VLAN tag 179.

The port VLAN tag 187 contains information indicative of the virtual local area network identifier (VLAN ID) and is configured according to the IEEE 802.1Q standards as described above with reference to FIG. 3A. The process by which the port VLAN tag 177 is inserted between the source address field 172 and the provider bridge VLAN tag 179 of the data packet 163 is described below with reference to block 804 of method 800 in FIG. 8.

Figure 5A:
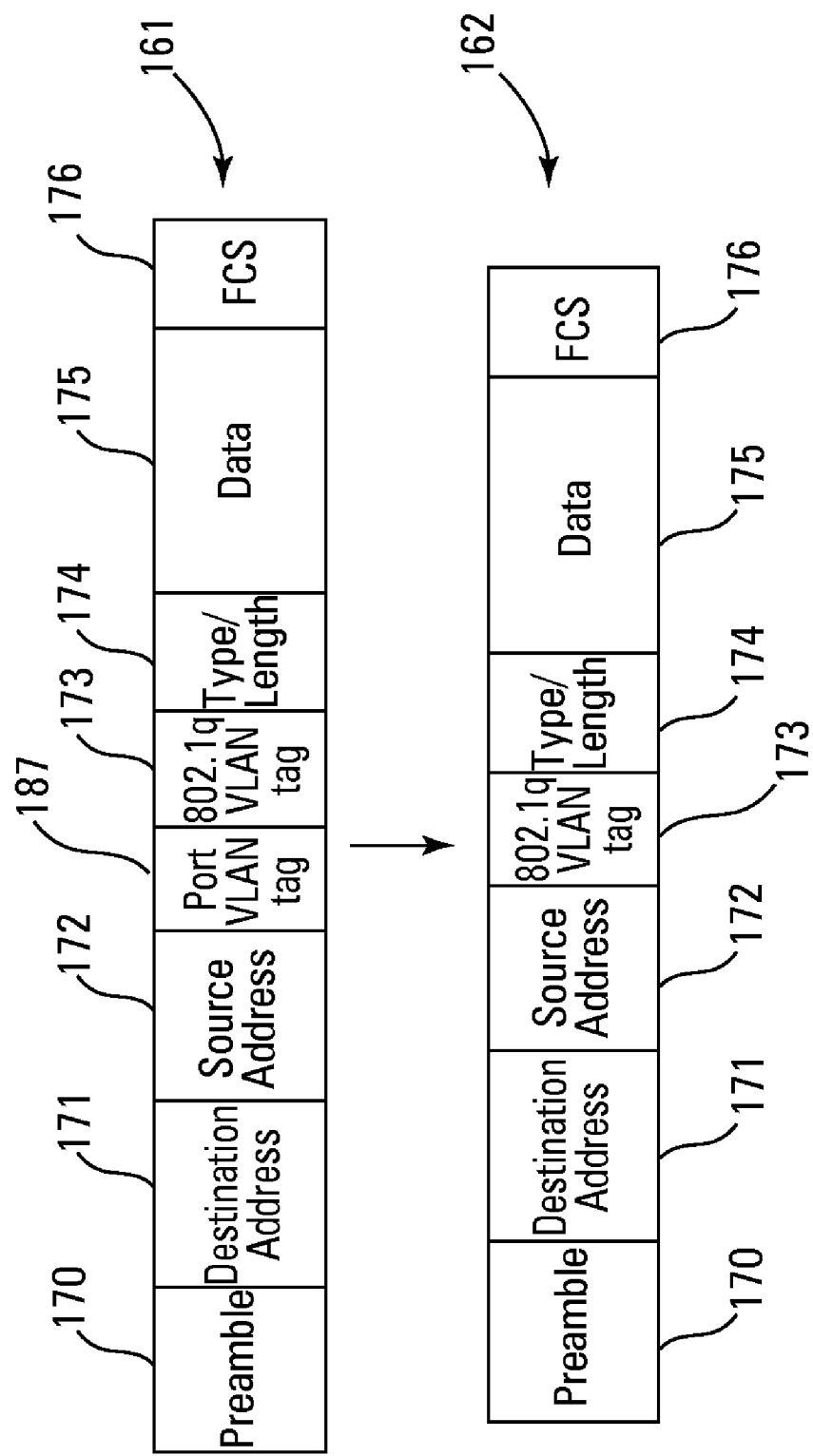
FIGS. 5A and 5B are block diagrams of embodiments of data packets modified for egress from an internal device.
Figure 5B:
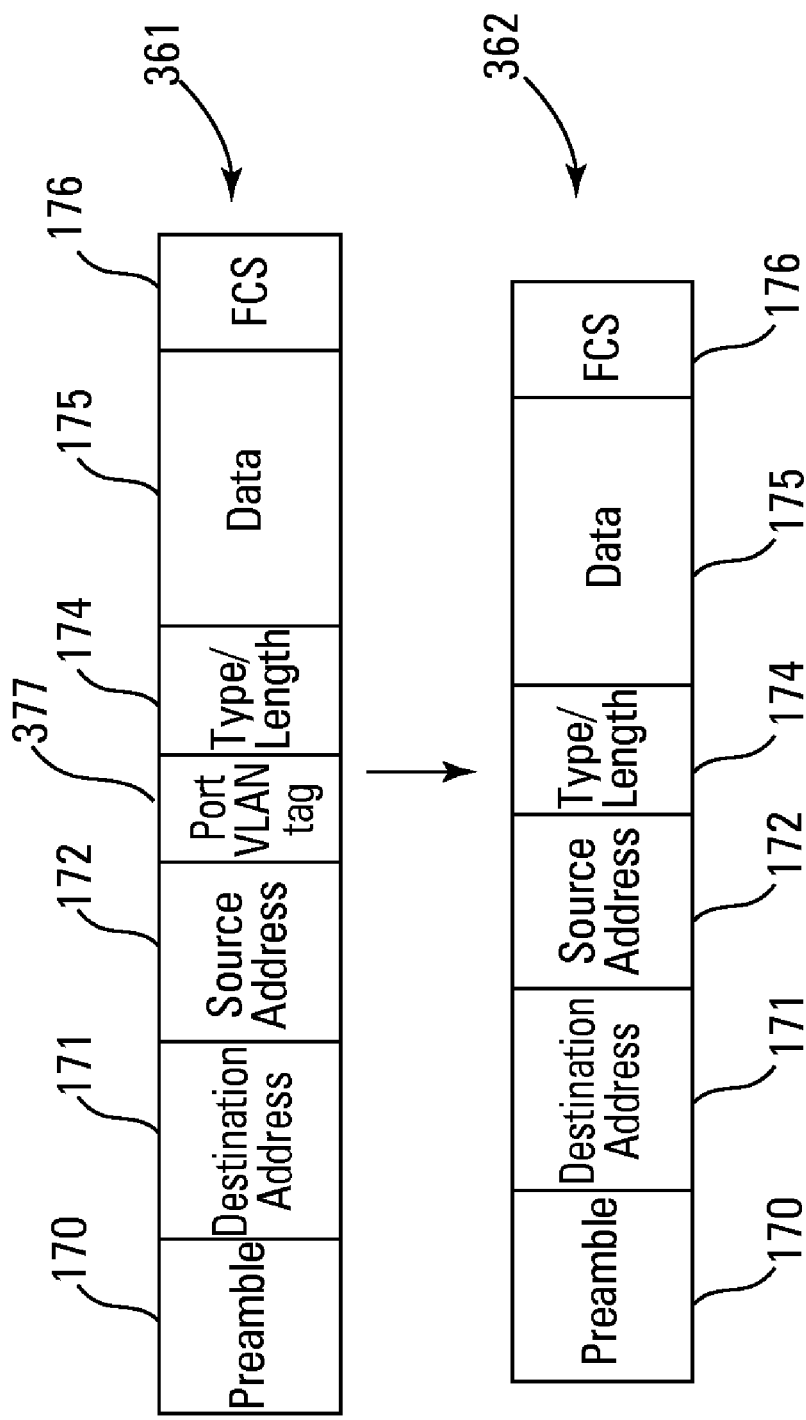

FIGS. 5A and 5B are block diagrams of embodiments of data packets modified for egress from an internal device. FIG. 5A is a block diagram of an embodiment of data packet 161 modified for egress from the internal device 200. The exemplary data packet 161 is addressed to an external port 300, 301 or 302 for transmission in a communication network (not shown) that includes the internal device 200 and the connector device 100. The data packet 161 shown in FIG. 5A is being transmitted according to the standards set by the IEEE committee to develop Standards for Local and Metropolitan Area Networks Virtual Bridged Local Area Networks in the 802.1Q VLAN specification as described above with reference to FIG. 3A.

The data packet 161 is formed by modifying the data packet 162 output from an application 251, 252 or 253 running on the internal processor 210. Data packet 162 includes the preamble field 170, the destination address field 171, the source address field 172, the 802.1Q VLAN tag 173, the type field/length 174, the data field 175, and the frame check sequence (FCS) field. In order to switch data packet 162 between the internal device 200 and external ports 300-302 that are communicatively coupled to the connector device 100, the data packet 162 is configured with an additional VLAN tag. Thus, the data packet 162 is modified to form data packet 161 by the inclusion of a port VLAN tag 187, between the source address field 172 and the 802.1Q VLAN tag 173. When the data packet 161 is received at the external-coupling ports, the data packet 161 is modified back to the format of data packet 162 for output to an external port.

The port VLAN tag 187 contains information indicative of the virtual local area network identifier (VLAN ID) and is configured according to the IEEE 802.1Q standards. Specifically, the port VLAN tag 187 is configured in a manner similar to the port VLAN tag 177 as described above with reference to FIG. 3A.

The port VLAN tag 187 configures the connector device 100 to direct the data packet 161 to the correct internal-device port 260 or 261 of the internal device 200 and through the connector device 100 for output at one of the external ports 300, 301 or 302. Once the data packet 161 is at the correct external coupling port 150, 151, or 152, the port VLAN tag 187 removed from the data packet 161 and the data packet 162 is output from the connector device 100 to the communicatively coupled external port 300, 301, or 302. The process by which the port VLAN tag 187 is removed from the data packet 161 is described below with reference to block 914 of method 900 in FIG. 9.

FIG. 5B is a block diagram of an embodiment of a data packet modified for egress from the internal device 200. In this embodiment, the data packet 361 is an Ethernet frame configured according to IEEE 802.3-2002 standards and the data packet 362 is an Ethernet frame from which the port VLAN tag 377 is removed. The exemplary data packet 361 is addressed to an external port 300, 301 or 302 for transmission in a communication network (not shown) that includes the internal device 200 and the connector device 100.

The data packet 361 is formed by modifying the data packet 362 output from an application 251, 252 or 253 running on the internal processor 210. Data packet 362 includes the preamble field 170, the destination address field 171, the source address field 172, the type field/length 174, the data field 175, and the frame check sequence (FCS) field. In order to switch data packet 362 between the internal device 200 and external ports 300-302 that are communicatively coupled to the connector device 100, the data packet 362 is configured with an additional port VLAN tag 377 between the source address field 172 and the type field/length 174. When the data packet 361 is received at the external-coupling ports, the data packet 361 is modified back to the format of data packet 362 for output to an external port.

The port VLAN tag 377 contains information indicative of the virtual local area network identifier (VLAN ID) and is configured according to the IEEE 802.1Q standards. Specifically, the port VLAN tag 377 is configured in a manner similar to the port VLAN tag 377 as described above with reference to FIG. 3B.

The port VLAN tag 377 configures the connector device 100 to direct the data packet 361 to the correct internal-device port 260 or 261 of the internal device 200 and through the connector device 100 for output at one of the external ports 300, 301 or 302. Once the data packet 361 is at the correct external coupling port 150, 151, or 152, the port VLAN tag 377 is removed from the data packet 361 and the data packet 362 is output from the connector device 100 to the communicatively coupled external port 300, 301, or 302. The process by which the port VLAN tag 377 is removed from the data packet 361 is described below with reference to block 914 of method 900 in FIG. 9.

Figure 6:
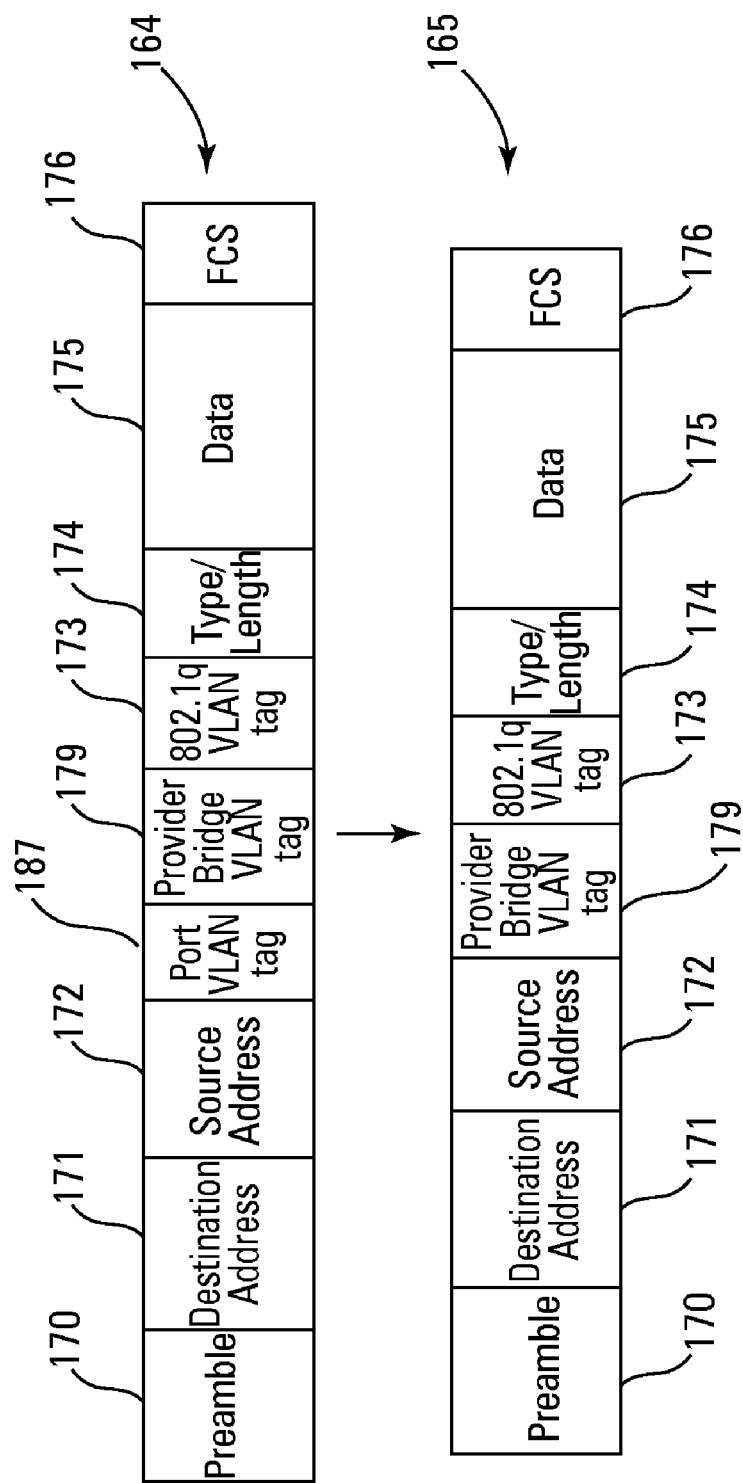
FIG. 6 is a block diagram of an embodiment of a data packet modified for egress from a provider bridge.

FIG. 6 is a block diagram of an embodiment of the data packet 164 configured according to the IEEE 802.1AD standards and modified for egress from an internal device 200 that includes a provider bridge 265. In this case, the data packet 164 includes a port VLAN tag 187 between the provider bridge VLAN tag 179 and the source address field 172. The provider bridge 265 inputs the data packet 165 to the internal device 200. The internal processor 210 inserts a port VLAN tag 187 that includes the VLAN identifier between the source address field 172 and the provider bridge VLAN tag 179. In this implementation, the data packet 164 replaces the data packet 161 of FIG. 5. The provider bridge VLAN tag 179 contains information indicative of the virtual local area network (VLAN) tag and is configured according to the IEEE 802.1AD standards.

The port VLAN tag 187 configures the connector device 100 to direct the data packet 164 to the correct internal-device port 260 or 261 of the internal device 200 and through the connector device 100 for output at one of the external ports 300, 301 or 302. Once the data packet 164 is at the correct external coupling port 150, 151, or 152, the port VLAN tag 187 removed from the data packet 164 and the data packet 165 is output from the connector device 100 to the communicatively coupled external port 300, 301, or 302. The process by which the port VLAN tag 187 is removed from the data packet 164 is described below with reference to block 914 of method 900 in FIG. 9.

In one implementation of this embodiment, the data packet 165 is an Ethernet frame configured according to 802.1Q standards and the IEEE 802.1AD standards.

Figure 7:
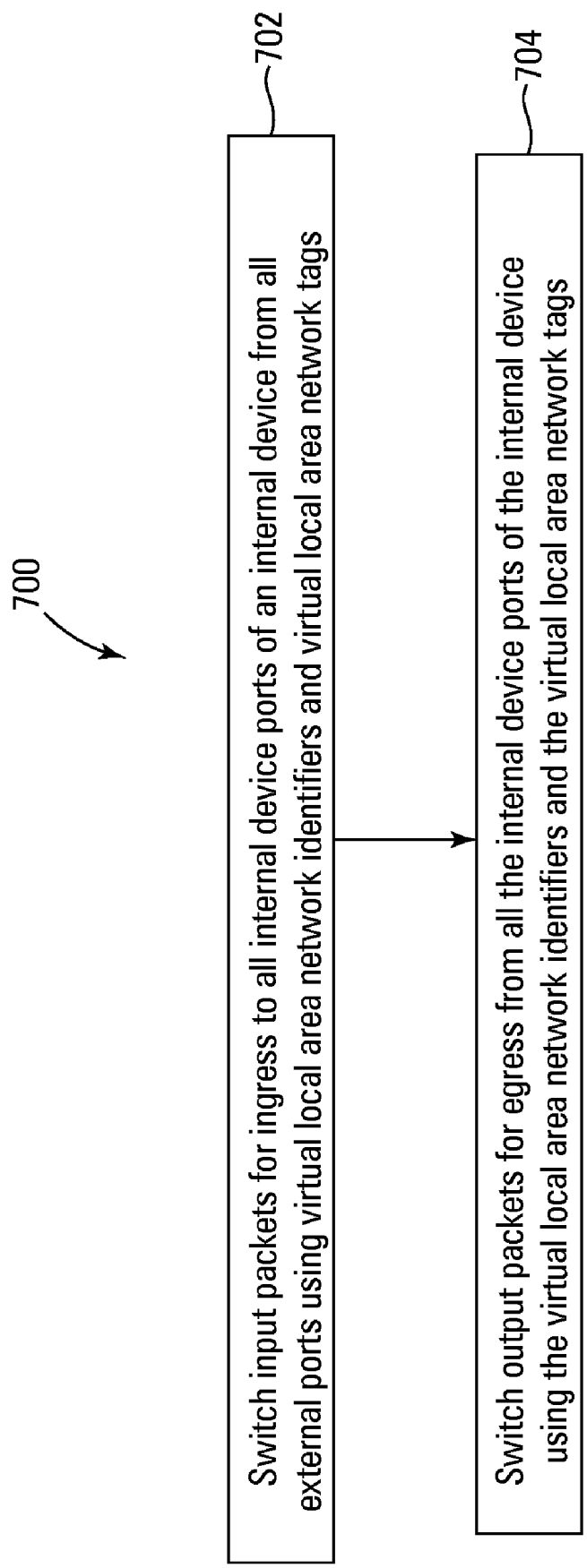
FIG. 7 is a flowchart of one embodiment of a method to map external ports.

FIG. 7 is a flowchart of one embodiment of a method 700 to map external ports. At block 702, input data packets are switched for ingress to all internal-device ports of an internal device from all external ports using virtual local area network identifiers and virtual local area network tags. There are more external ports than internal-device ports. The internal device has visibility to all the external ports. The process is described in detail below with reference to method 800 in FIG. 8.

In one implementation of block 702 which uses the system 10 of FIG. 2 and the data packets of FIG. 3A, the processor 110 executes software 130 to switch input data packets 161 for ingress all internal-device ports 260 and 261 of the internal device 200 from all external ports 300-302 using virtual local area network identifiers in the port VLAN tag 177 of data packet 161.

At block 704, output data packets are switched for egress from all the internal-device ports of the internal device using the virtual local area network identifiers and the virtual local area network tags. There are more external ports than internal-device ports. The process is described in detail below with reference to method 900 in FIG. 9.

In one implementation of block 704 which uses the system 10 of FIG. 2 and the data packets of FIG. 5, the processor 110 executes software 130 to switch output data packets 161 for egress from all the internal-device ports 260 and 261 of the internal device 200 to the external ports 300-302. The egress is provided by the virtual local area network identifiers in the in the port VLAN tag 187 of data packet 161. In this exemplary case, there are more external ports 300-302 than internal-device ports 260-261 and the applications 251, 252, and 253 in the internal device have visibility to all the external ports 300-302.

Figure 8:
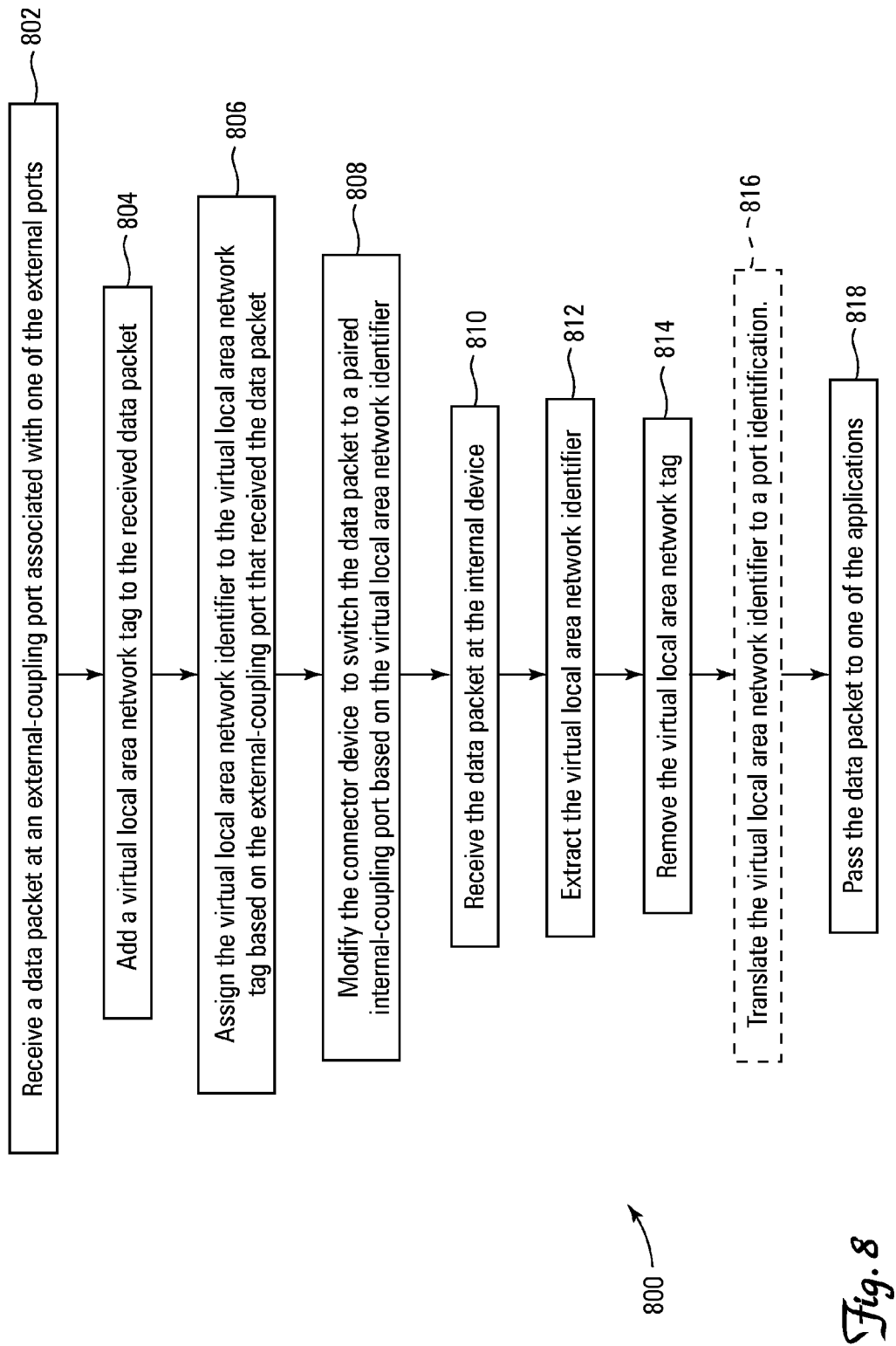
FIG. 8 is a flowchart of one embodiment of a method to switch input packets for ingress.

FIG. 8 is a flowchart of one embodiment of a method 800 to switch input packets for ingress. At block 802, a data packet is received at an external-coupling port associated with one of the external ports. At block 804, a virtual local area network tag is added to the received data packet. At block 806, the virtual local area network identifier is assigned to the virtual local area network tag based on the external-coupling port that received the data packet. In one implementation of this embodiment, the virtual local area network identifier is added to the tag control information of the virtual local area network tag. The virtual local area network identifier is assigned based on the identifier of the external-coupling port and the assignment is implemented based on a mapping table.

At block 808, the connector device is modified to switch the data packet to a paired internal-coupling port based on the virtual local area network identifier. At block 810, the data packet is received at the internal device. At block 812, the virtual local area network identifier is extracted from the virtual local area network tag. At block 814, the virtual local area network tag is removed from the data packet.

Block 816 is optional and is implemented if the VLAN ID is not equal to the port identifier used by the application. At block 816, the virtual local area network identifier is translated to a port identification. At block 818, the data packet is passed to one of the applications in the internal device. The virtual local area network identifier that was implemented in the VLAN tag during input from the external port via the connector device is transparent to the application in the internal device.

In one implementation of method 800, the system 10 of FIG. 2 is implemented to pass the data packet 161 of FIG. 3A. In this implementation, the processor 110 receives a data packet 160 at an external-coupling port 150, 151, or 152 associated with one of the external ports 300, 301, or 302, respectively (block 802). In one implementation of this embodiment, there are more than three external-coupling ports. The processor 110 executing software 130 adds a virtual local area network tag, such as port VLAN tag 177, to the received data packet 160 to form the data packet 161 (block 804). The port VLAN tag 177 is configured to receive the VLAN identifier. The processor 110 executing software 130 assigns the virtual local area network identifier based on the external-coupling port, such as external port 300, 301 or 302 that received the data packet 160 (block 806). The VLAN identifier is used in conjunction with the mapping table (TABLE 3) stored in memory 120 for the connector device 100. For example, if the data packet 160 is input via external port 300, which has the numerical identifier "0," the VLAN identifier is VLAN ID (1).

The processor 110 executing software 130 modifies the connector device 100 to switch the modified data packet 161 to a paired internal-coupling port based on the virtual local area network identifier (block 808). The internal processor 210 receives the data packet 161 at the internal device 200 (block 810). The internal processor 210 executing software 230 extracts the virtual local area network identifier (block 812) from the port VLAN tag 177. The internal processor 210 executing software 230 removes the port VLAN tag (block 814). The data packet is now configured like the data packet 160 that was received at the processor 110 during block 802. The internal processor 210 executing software 230 optionally translates the virtual local area network identifier to the port identification (block 816). Block 816 is implemented only if the VLAN ID is not equal to the port identification used by the application. In an exemplary implementation of a translation, the connector device 100 is a commercial device that is designed to number its ports from 0, say 0, 1, 2, 3, and 4. Zero has a special meaning as a VLAN ID, so the port ID=0 is excluded. In this case, the port identification of numerals 0, 1, 2, 3, and 4 are mapped to the VLAN IDs 1, 2, 3, 4, and 5. The translation in this exemplary case is a simple addition/subtraction, although complex translations can be implemented.

In another exemplary implementation of a translation, the VLAN IDs are only 12 bits. Sometimes applications use port identifications that are 16 or 32 bit integers. A translation allows port ID assignment in the range outside the VLAN ID.

The internal processor 210 executing software 230 passes the data packet 160 to one of the applications 251, 252, or 253 (block 818). The data packet 160 is configured identically to the data packet received by the connector device 100 at the external-coupling port 150, 151, or 152. Thus, the addition of the port VLAN tag 177 to the data packet 160 is transparent to the external ports 300, 301 or 302, respectively, and to the applications 251, 252 or 253, that receive the data packet 160 from the external port 300, 301 or 302.

Figure 9:
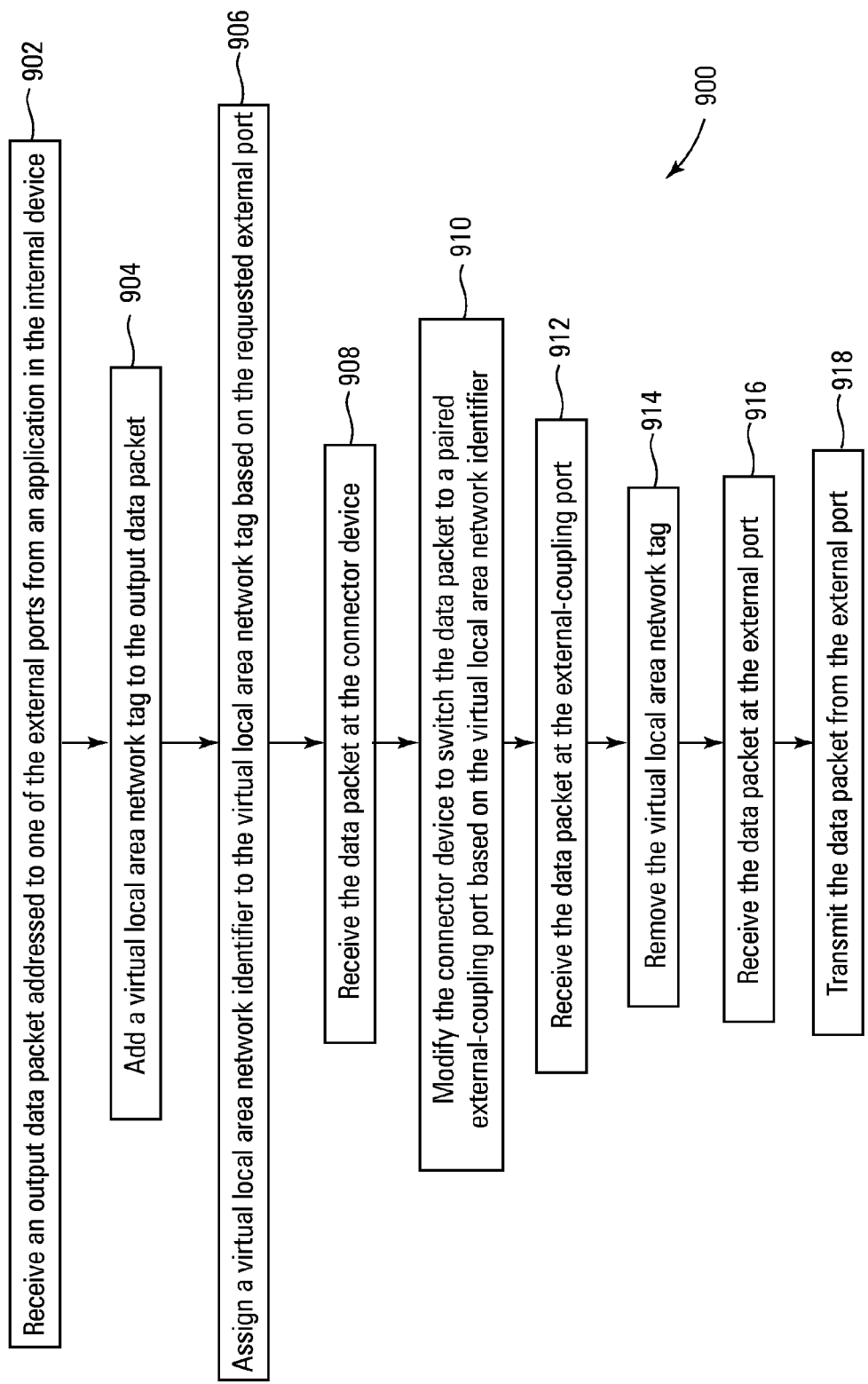
FIG. 9 is a flowchart of one embodiment of a method to switch output packets for egress.

FIG. 9 is a flowchart of one embodiment of a method 900 to switch output packets for egress. At block 902, an output data packet addressed to one of the external ports from an application is received in the internal device. In an implementation of this embodiment in which the optional block 816 was implemented during method 800 as described above with reference to FIG. 8, the internal device translates the port identification in the output data packet to the virtual local area network identifier during block 902.

At block 904, a virtual local area network tag is added to the output data packet. At block 906, the virtual local area network identifier is assigned to the virtual local area network tag. The value of the assigned virtual local area network identifier is based on an identifier of the external port addressed in the output data packet received during block 902. At block 908, the data packet is received at the connector device. At block 910, the connector device is modified to switch the data packet to a paired external-coupling port based on the virtual local area network identifier.

At block 912, the data packet is received at the external-coupling port. At block 914, the virtual local area network tag is removed from the data packet. At block 916, the data packet is received at the external port. At block 918, the data packet is transmitted from the external port that was addressed in the output data packet received at the internal device 200 during block 902. The virtual local area network identifier that was implemented in the VLAN tag during output from the internal device via the connector device is transparent to the external port.

In one implementation of method 900, the system 10 of FIG. 2 is implemented to pass the data packet 162 of FIG. 5. In this implementation, the internal processor 210 receives output data packet that is configured like data packet 162, shown in FIG. 5. The data packet 162 is addressed to one of the external ports, such as external port 300, 301 or 302, from an application, such as application 251, 252 or 253, in the internal device (block 902). The internal processor 210 executing software 230 adds a virtual local area network tag, such as Port VLAN tag 187, to the output data packet (block 904). Now the output data packet is configured like data packet 164 as shown in FIG. 5. The internal processor 210 executing software 230 assigns the virtual local area network identifier to the port VLAN tag 187 based on the requested external port 300, 301 or 302 (block 906). For example, if the data packet 161 is to be sent to the external port 302, the VLAN ID (3) is assigned as the tag control information of the Port VLAN tag 187 in the output data packet 164. Likewise, if the data packet 161 is to be sent to the external port 301, the VLAN ID (1) is assigned as the virtual local area network identifier in the tag control information of the Port VLAN tag 187 in the output data packet 164.

The processor 110 receives the data packet 161 at the connector device (block 908). The processor 110 executing software 130 modifies the connector device 100 to switch the data packet 161 to a paired external-coupling port 300, 301, or 302 based on the virtual local area network identifier (block 910). The data packet 161 is received at the external-coupling port 150, 151 or 152 (block 912). The processor 110 executing software 130 removes the port VLAN tag 187 (block 914). Now the output data packet is configured like data packet 162. The external port 300, 301, or 302 receives the data packet 162 (block 916). The external port 300, 301, or 302 implements port processing to transmit the data packet 162 from the external port 300, 301, or 302 (block 918). The data packet 162 that is transmitted from the external ports 300-300 is configured identically to the data packet output from the application 251, 252, or 253 running on the internal processor 210. The addition of the port VLAN tag 177 during passage of the data packet 161 through the connector device 100 is transparent to the external ports 300, 301 or 302 that receive the data packet 162 from the external-coupling port 150, 151, or 152.

Figure 10:
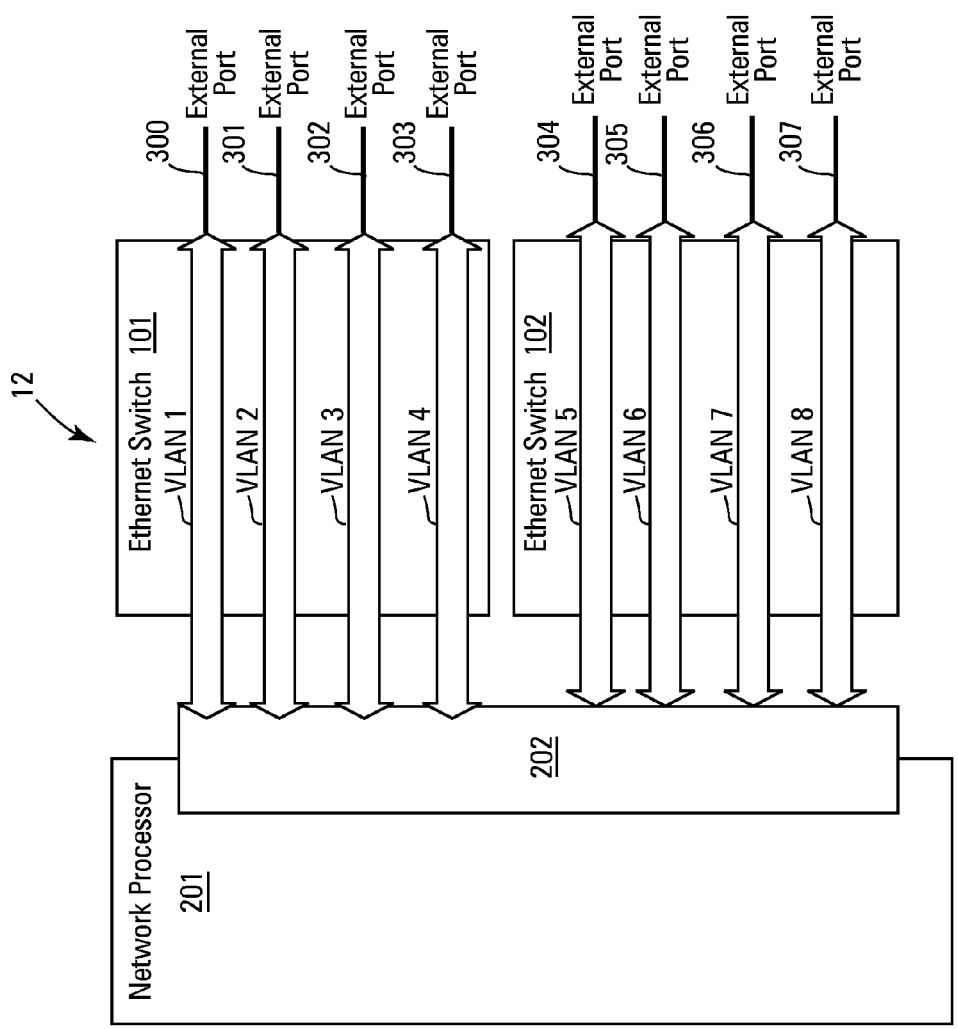
FIG. 10 is a generic block diagram of one embodiment of a system to map external ports to an internal device via a plurality of connector devices.

FIG. 10 is a generic block diagram of one embodiment of a system 12 to map external ports 300-307 to an internal device via a plurality of connector devices. In FIG. 10, the internal device is referred to as network processor 201. The network processor 201 has one physical port 202 through which communicative signals are transmitted from the eight external ports 300-307. The network processor 201 is the same internal device described in FIG. 1. Unlike system 10 of FIG. 1, the network processor 201 in system 12 is communicatively coupled to more than one connector device.

Figure 11:
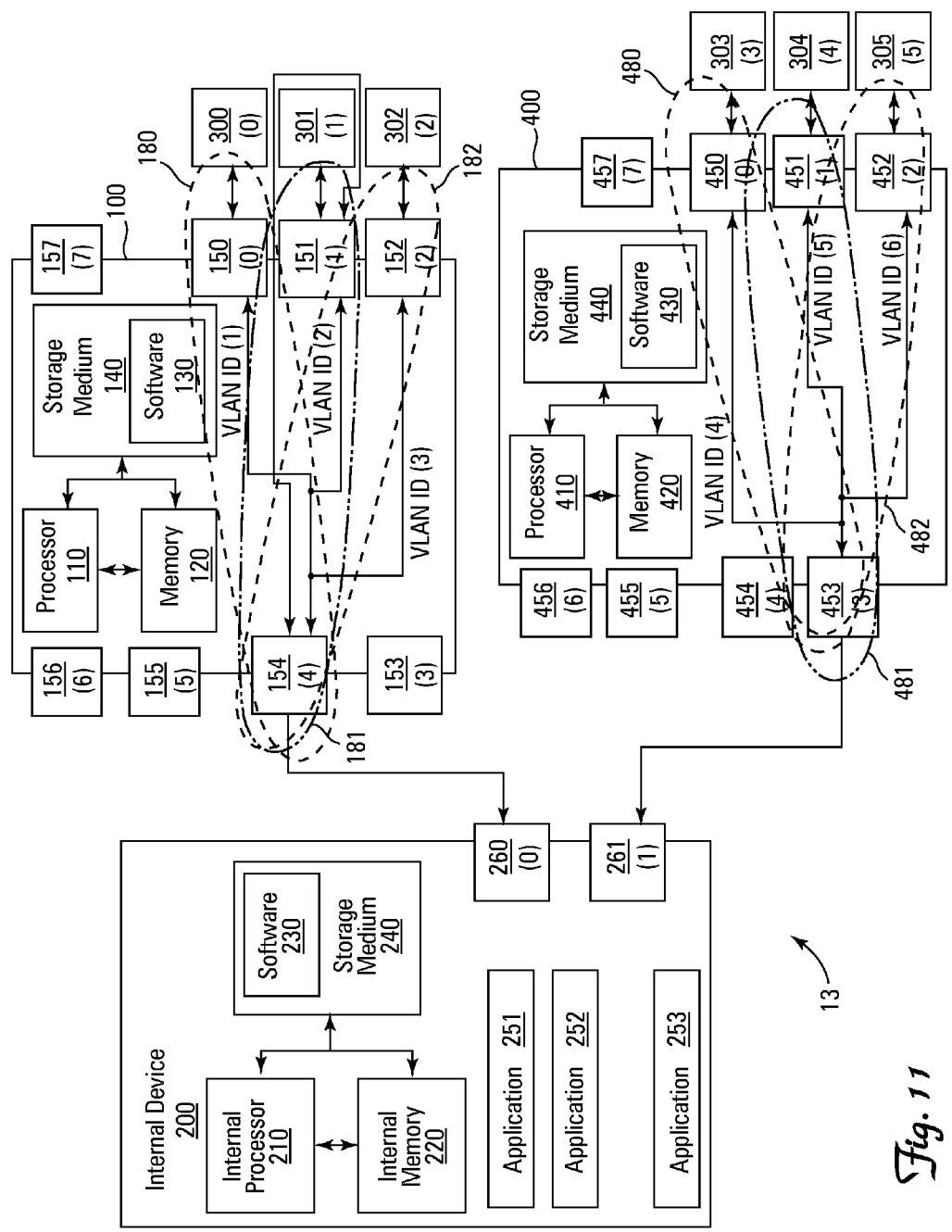
FIG. 11 is a block diagram of one embodiment of a system to map external ports to an internal device via a plurality of connector devices.

In FIG. 10, the plurality of connector devices comprise two connector devices that are referred to as "Ethernet switch 101" and "Ethernet switch 102." Ethernet switch 101 is communicatively coupled to the four ports 300, 301, 302, and 303 via respective VLAN-1, VLAN-2, VLAN-3, and VLAN-4. Ethernet switch 102 is communicatively coupled to the four ports 304, 305, 306, and 307 via respective VLAN-5, VLAN-6, VLAN-7, and VLAN-8. The VLAN-n represents a virtual wire or communicative pathway that is created by reconfiguring the Ethernet switch 101 or Ethernet switch 102 responsive to software in the respective Ethernet switch 101 or Ethernet switch 102. The software in the Ethernet switch 101 and Ethernet switch 102 uses the Institute of Electrical and Electronics Engineers (IEEE) 802.1Q format FIG. 11 is a block diagram of one embodiment of a system 13 to map external ports 300-305 to an internal device 200 via a plurality of connector devices. The system 13 includes the internal device 200 and a plurality of connector devices that include connector device 100 and connector device 400. The internal-coupling port 154 of the connector device 100 is communicatively coupled to the internal device 200. Additionally, the internal-coupling port 453 of connector device 400 is communicatively coupled to the internal device 200.

The internal device 200 was described above with reference to FIG. 2. The internal memory 220 stores an internal configuration table associating the internal-device ports 260 and 261 with at least one of the virtual local area network identifiers, which are shown in the connector device 100 as VLAN ID (1), VLAN ID (2), and VLAN ID (3) and which are shown in the connector device 400 as VLAN ID (4), VLAN ID (5), and VLAN ID (6). As shown in FIG. 11, the internal-device ports 260 and 261 each have an internal-device port identifier (shown in parenthesis in FIG. 11). The internal-device port identifier is used in the internal mapping table stored in the internal memory 220. The internal mapping table for the internal device 200, as it is being implemented in FIG. 11, is shown in TABLE 4.

TABLE 4

| VLAN Identifier | Internal-device Port Identifier |
|---|---|
| 1 | 0 |
| 2 | 0 |
| 3 | 0 |
| 4 | 1 |
| 5 | 1 |
| 6 | 1 |

The connector device 100 was described above with reference to FIG. 2. In FIG. 11, the connector device 100 is configured differently. In this case, the external-coupling port 152 is paired with internal-coupling port 154. This pairing is generally indicated as paired external-coupling port and internal-coupling port 182 and is also referred to here as "paired ports 182." In this embodiment, the port 153 is an unused port. In one implementation of this embodiment, there are additional internal device ports in the internal device 200 and port 153 is communicatively coupled to the additional internal device ports in the internal device 200.

The connector device 400 is similar to connector device 100. Connector device 400 has ports 450-457, a processor 410, a memory 420, and a storage medium 440 including software 430. The ports 450-457 in the connector device 400 as implemented in FIG. 11 comprise internal-coupling port 453, external coupling ports 450, 451 and 452 and unused ports 454, 455, 456 and 457. The unused ports function in the manner described above with reference to FIG. 1. The external-coupling ports 450, 451 and 452 are communicatively coupled with respective external ports 303, 304 and 305. The internal-coupling port 453 is communicatively coupled with internal-device port 261 of the internal device 200.

As described above with reference to connector device in FIG. 2, the virtual local area network identifier identifies a paired external-coupling port and internal-coupling port. In the connector device 400, there is always at least one internal-coupling port paired with more than one external-coupling port. As shown in FIG. 11, the external-coupling ports 450, 451 and 452 are all paired with internal-coupling port 453. The pairing of the external-coupling port 450 with internal-coupling port 453 is generally indicated as paired external-coupling port and internal-coupling port 480 and is also referred to here as "paired ports 480." The pairing of the external-coupling port 451 with internal-coupling port 453 is generally indicated as paired external-coupling port and internal-coupling port 481 and is also referred to here as "paired ports 481." The pairing of the external-coupling port 452 with internal-coupling port 453 is generally indicated as paired external-coupling port and internal-coupling port 482 and is also referred to here as "paired ports 482.

As shown in FIG. 11, the ports 150-157, 450-457, 300-305, and 260-261 each have a numerical identifier shown in parenthesis. The numerical identifiers for ports 150-157 and 300-302 are used in the mapping tables and configuration tables stored in memory 120. Likewise, the numerical identifier for ports 450-457 and 303-305 are used in the mapping tables and configuration tables stored in memory 420.

The memory 420 is communicatively coupled to the processor 410 and the storage medium 440. The processor 410 is also communicatively coupled to the storage medium 440. The processor 410 directs data packets, which are input to the connector device 400, between the internal-coupling port 453 and the external ports 303, 304, and 305 based on the virtual local area network identifier in the data packet. The directing is based on the configuration table and the mapping table.

The configuration table stored in memory 120 for the connector device 100, as it is being implemented in FIG. 11, is shown in TABLE 5.

TABLE 5

| VLAN Identifier (ID) | External-Coupling Port Identifier | Internal-Coupling Port Identifier |
|---|---|---|
| 1 | 0 | 4 |
| 2 | 1 | 4 |
| 3 | 2 | 4 |

The configuration table stored in memory 420 for the connector device 400, as it is being implemented in FIG. 11, is shown in TABLE 6.

TABLE 6

| VLAN Identifier (ID) | External-Coupling Port Identifier | Internal-Coupling Port Identifier |
|---|---|---|
| 4 | 0 | 3 |
| 5 | 1 | 3 |
| 6 | 2 | 3 |

The mapping table stored in memory 120 for the connector device 100, as it is being implemented in FIG. 11, is shown in TABLE 3. The mapping table stored in memory 420 for the connector device 400, as it is being implemented in FIG. 11, is shown in TABLE 7. The VLAN identifiers (ID) are shown in the mapping tables (TABLE 3 and TABLE 7) for each external port identifier.

TABLE 7

| VLAN Identifier (ID) | External Port Identifier |
|---|---|
| 4 | 3 |
| 5 | 4 |
| 6 | 5 |

Virtual local area network identifiers assigned to a VLAN tag in the data packet are used to switch data packets between the internal device 200 and external ports 300-305 that are communicatively coupled to the connector devices 100 and 400.

Figure 12:
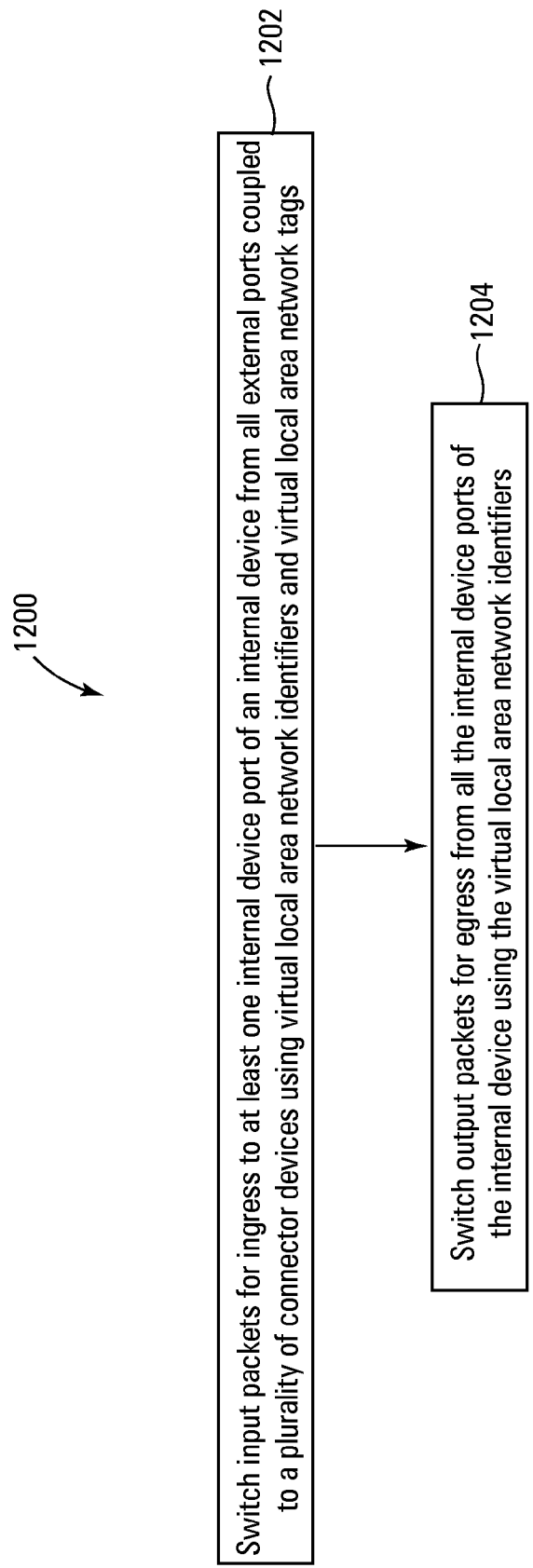
FIG. 12 is a flowchart of one embodiment of a method to map external ports via a plurality of connector devices.

The method of mapping the external ports via more than one connector device is an extension of the mapping of external ports via one connector device described above with reference to methods 700, 800, and 900 of respective FIGS. 7, 8 and 9. FIG. 12 is a flowchart of one embodiment of a method 1200 to map external ports via a plurality of connector devices. Method 1200 is implemented when there are more external ports than internal-device ports in order to provide all applications in the internal device with visibility to all the external ports coupled to a plurality of connector devices.

At block 1202, input data packets are switched for ingress to all internal-device ports of an internal device from all external ports coupled to a plurality of connector devices using virtual local area network identifiers and port virtual local area network tags. The process is described in detail below with reference to method 1300 in FIGS. 13 and 14.

At block 1204, output data packets are switched for egress from all the internal-device ports of the internal device using the virtual local area network identifiers and the port virtual local area network tags. The process is described in detail below with reference to method 1500 in FIGS. 15, 16 and 17.

In one implementation of method 1200, uses the system 13 of FIG. 11 and the data packets of FIGS. 3 and 5. In this implementation of method 1200, there are two connector devices 100 and 400. The processors 110 and 410 execute respective software 130 and 430 to switch input data packets 161 for ingress all internal-device ports 260 and 261 of the internal device 200 from all external ports 300-305 using virtual local area network identifiers in the port VLAN tag 177 of data packet 161 (block 1202). The processors 110 and 410 execute software 130 and 430, respectively, and the internal processor 210 executes internal software 230 to switch output data packets 161 for egress from all the internal-device ports 260 and 261 of the internal device 200 to the external ports 300-305 (block 1204). The egress is provided by the virtual local area network identifiers in the in the port VLAN tag 187 of data packet 161. In this exemplary case there are more external ports 300-305 than internal-device ports 260-261 and the applications 251, 252, and 253 in the internal device have visibility to all external ports 300-305. In another implementation of method 1200, there are more than two connector devices connected to the internal device 200.

Figure 13:
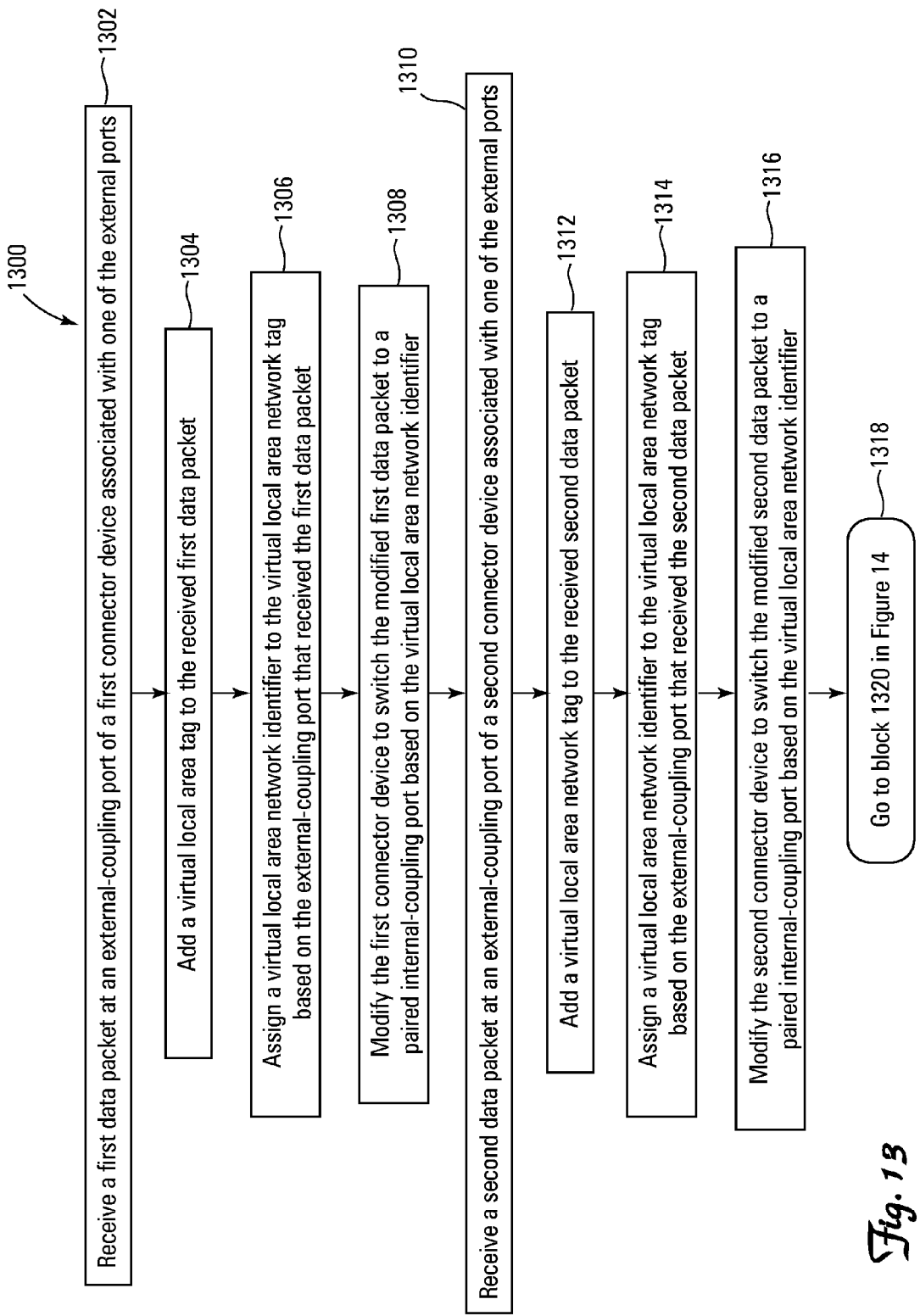
FIGS. 13 and 14 are flowcharts of one embodiment of a method to switch input packets for ingress via a plurality of connector devices.
Figure 14:
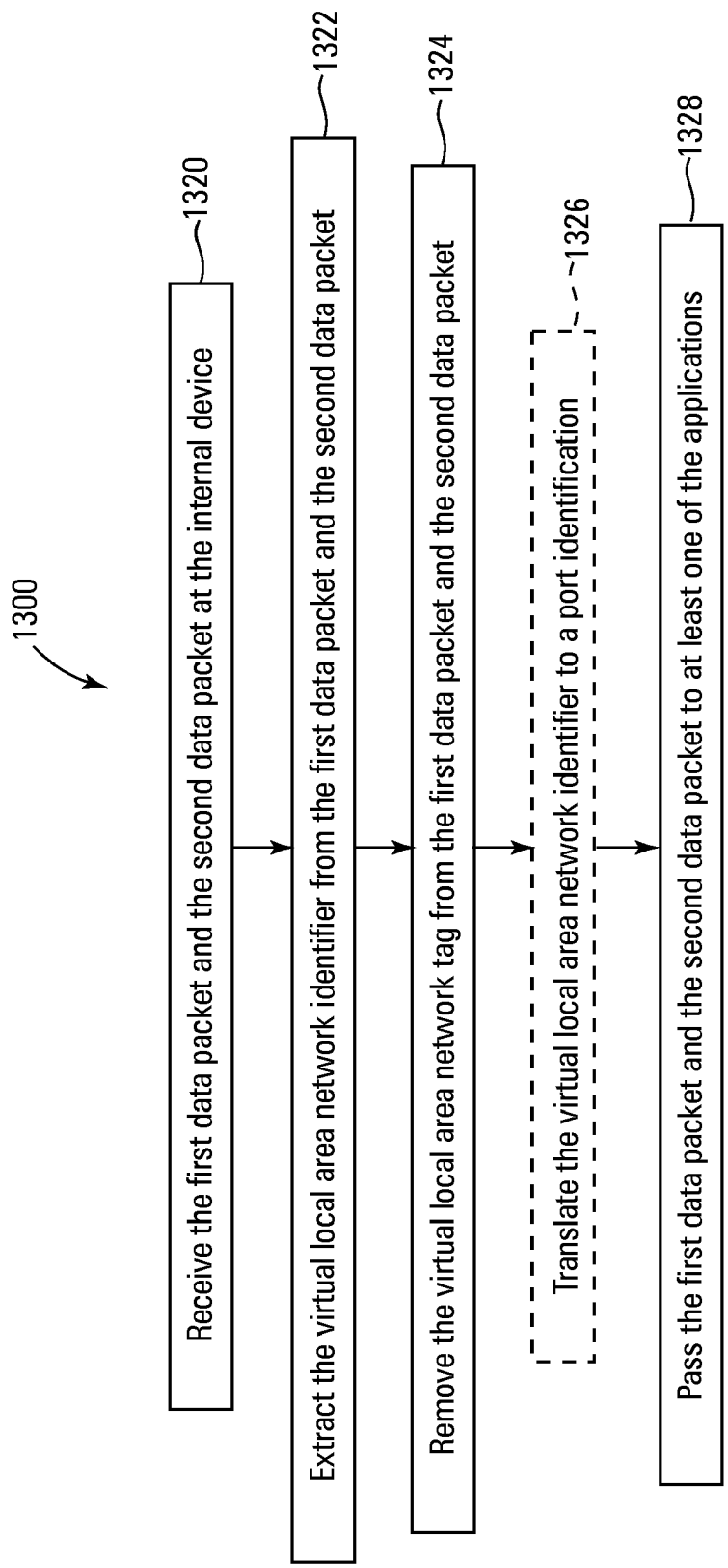

FIGS. 13 and 14 are flowcharts of one embodiment of a method 1300 to switch input packets for ingress via a plurality of connector devices. The switching is enabled between all the internal-device ports of an internal device and all external ports that are coupled to the plurality of connector devices.

In FIG. 13 at block 1302, a first data packet is received at an external-coupling port of a first connector device associated with one of the external ports. At block 1304, a virtual local area network tag is added to the received first data packet. At block 1306, the virtual local area network identifier (VLAN ID) is assigned to the virtual local area network tag based on the external-coupling port that received the first data packet. In one implementation of this embodiment, the virtual local area network tag is added to the tag control information of the virtual local area network tag. The virtual local area network identifier is assigned based on the identifier of the external-coupling port and the assignment is implemented based on the mapping table. At block 1308, the first connector device is modified to switch the modified first data packet to a paired internal-coupling port based on the virtual local area network identifier.

At block 1310, a second data packet is received at an external-coupling port of a second connector device associated with one of the external ports. At block 1312, a virtual local area network tag is added to the received second data packet. At block 1314, the virtual local area network identifier is assigned to the virtual local area network tag based on the external-coupling port that received the second data packet. In one implementation of this embodiment, the virtual local area network tag is added to the tag control information of the virtual local area network tag. The virtual local area network identifier is assigned based on the identifier of the external-coupling port and the assignment is implemented based on the mapping table. At block 1316, the second connector device is modified to switch the modified second data packet to a paired internal-coupling port based on the virtual local area network identifier. At block 1318, the flow is directed to proceed to block 1320 in FIG. 14.

In FIG. 13 at block 1320, the first data packet and the second data packet are received at the internal device. At block 1322, the virtual local area network identifier is extracted from the first data packet and the second data packet. At block 1324, the virtual local area network tag is removed from the first data packet and the second data packet. Block 1326 is optional and is implemented only if the VLAN ID is not equal to the port identification used by the application as described above with reference block 816 of method 800 in FIG. 8. At block 1326, the virtual local area network identifier is translated to a port identification. At block 1328, the first data packet and the second data packet are passed to at least one of the applications.

In one implementation of method 1300, the system 13 of FIG. 11 passes the first and second data packets, which are configured in the same manner as data packet 161 of FIG. 3A. In this implementation, the connector device 100 operates on the first data packet as described above with reference to the implementation of method 800 (FIG. 8) on the exemplary data packet 160. The connector device 400 operates in a similar manner on the second data packet. Specifically, the processor 410 receives the second data packet, referred to here as "second data packet 160" at an external-coupling port 450, 451, or 452 associated with one of the external ports 303, 304, or 305, respectively (block 1310). In one implementation of this embodiment, there are more than three external-coupling ports.

The processor 410 executing software 430 adds a virtual local area network tag, such as port VLAN tag 177 (FIG. 3A), to the received second data packet 160 to form the modified second data packet 161 (block 1312). The processor 410 executing software 430 assigns the virtual local area network identifier (VLAN ID) based on the external-coupling port, such as external port 303, 304, or 305 that received the second data packet 160 (block 1314). The virtual local area network identifier is assigned in conjunction with the mapping table (TABLE 7) stored in memory 420 for the connector device 400. For example, if the second data packet 160 is input via external port 303, which has the numerical identifier "3," the VLAN identifier is VLAN ID (4). The processor 410 executing software 430 modifies the connector device 400 to switch the modified second data packet 161 to a paired internal-coupling port based on the virtual local area network identifier (block 1316). The data packet 161 is output from the internal-coupling port 453.

The internal processor 210 receives the first and second data packets 161 at one of the internal-device ports 260 or 261 of the internal device 200 (block 1320). The internal processor 210 executing software 230 extracts the virtual local area network identifier from the first and second data packets 161 (block 1322). The internal processor 210 executing software 230 removes the virtual local area network tag from the first and second data packets 161 (block 1324). The first data packet is now configured like the first data packet 160 that was received at the processor 110 during block 1302 and the second data packet is now configured like the second data packet 160 that was received at the processor 410 during block 1310. The internal processor 210 executing software 230 optionally translates the virtual local area network identifier to a port identification (block 1326) for each of the first and second data packets 160. The internal processor 210 executing software 230 passes the first and second data packets 160 to one of the applications (block 1328). The data packets 160 are configured identically to the first and second data packets received by the respective connector devices 100 and 400 at the respective external-coupling port 150-152 and 450-452. Thus, the addition of the port VLAN tag 177 is transparent to the external ports 300-305 and to the applications 251, 252 or 253 that receive the first data packets from the external ports 300, 301 and 302 and that receive the second data packets from the external ports 303, 304 and 305.

Figure 15:
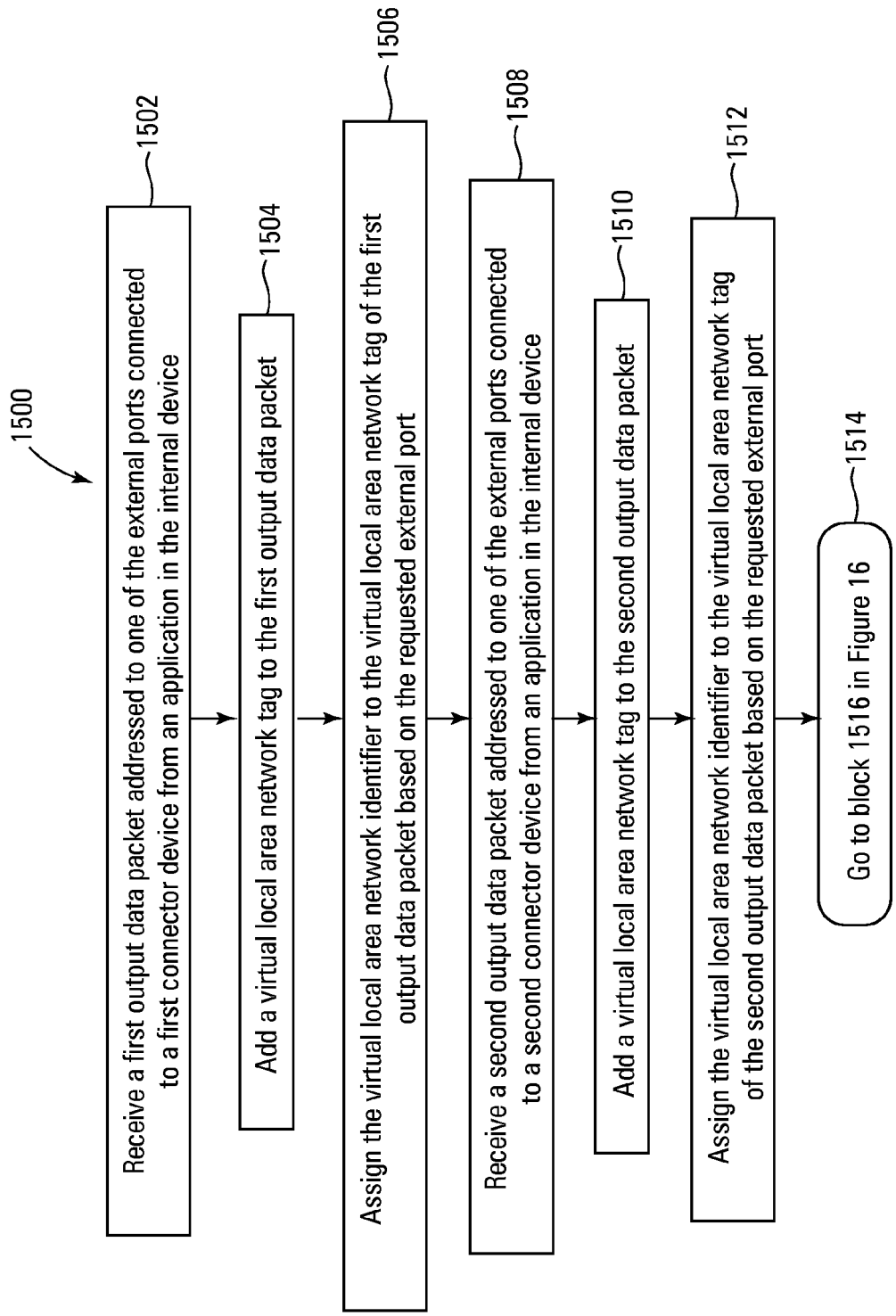
FIGS. 15, 16 and 17 are flowcharts of one embodiment of a method to switch output packets for egress via a plurality of connector devices.
Figure 16:
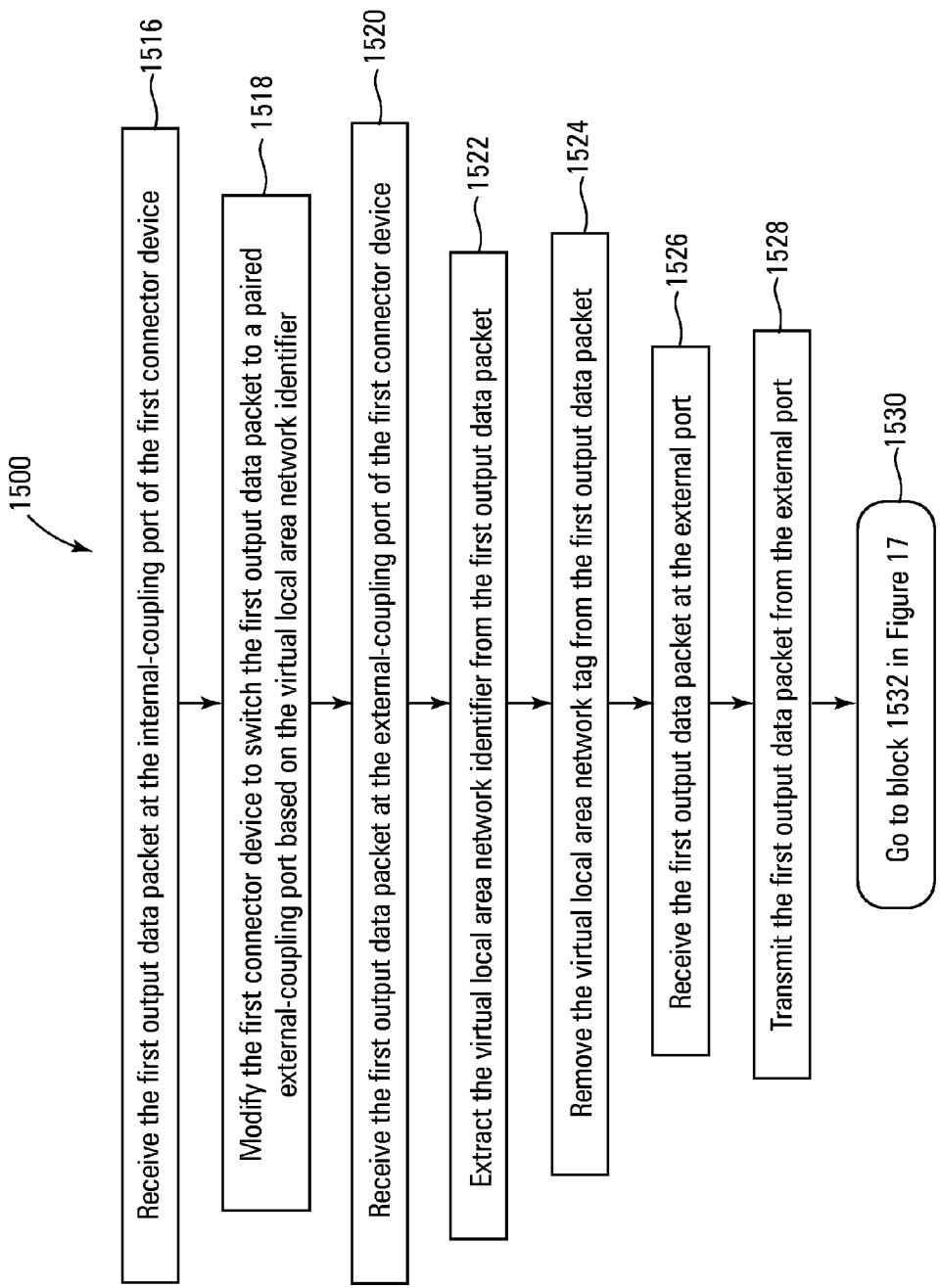
Figure 17:
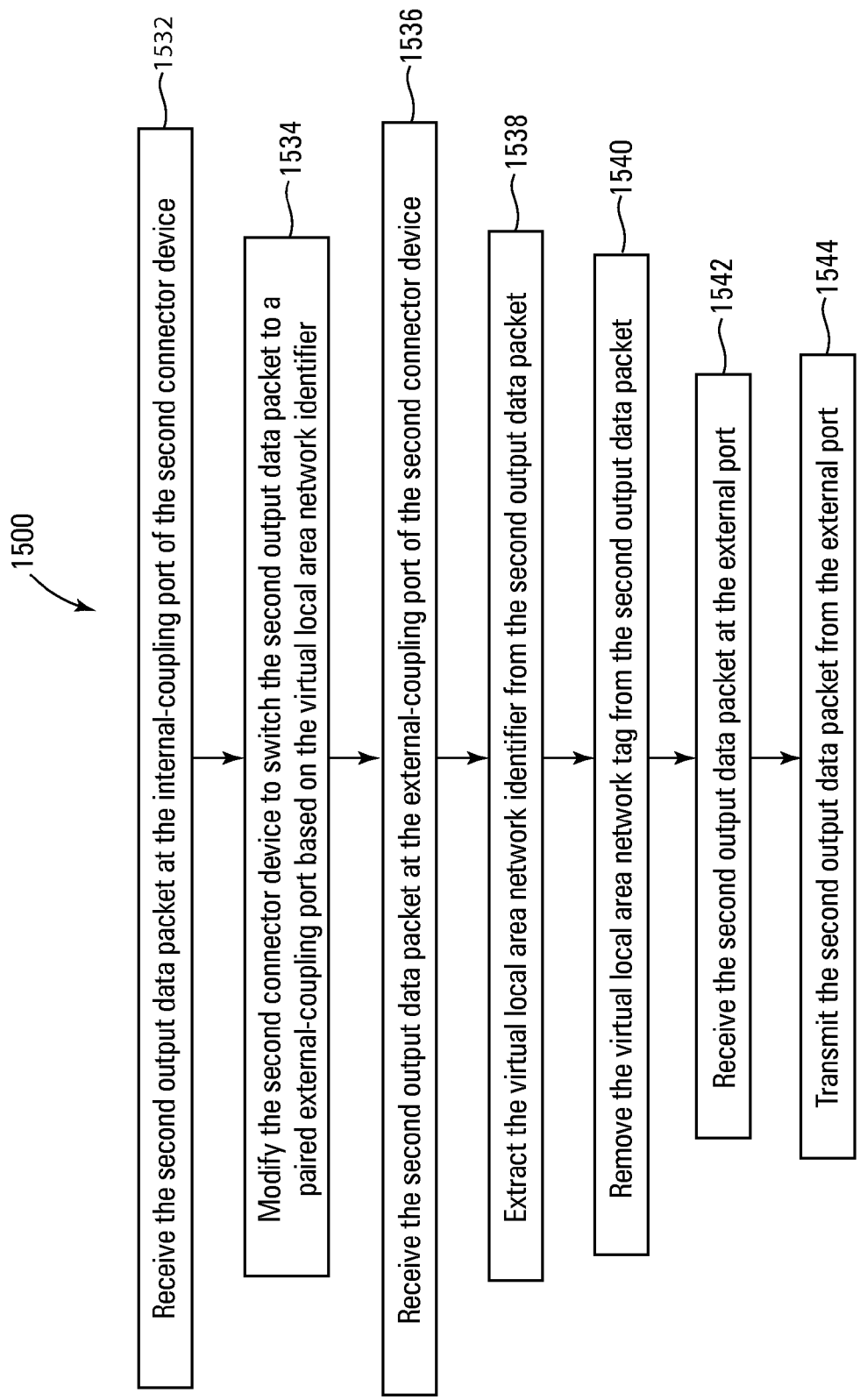

FIGS. 15, 16 and 17 are flowcharts of one embodiment of a method to switch output packets for egress via a plurality of connector devices. The switching is enabled between all the internal-device ports of an internal device and all external ports that are coupled to the plurality of connector devices. In FIG. 15 at block 1502, a first output data packet, which is addressed to one of the external ports connected to a first connector device, is received from an application in the internal device. In an implementation of this embodiment in which the optional block 1326 was implemented during method 1300 as described above with reference to FIG. 14, the internal device translates the port identification in the first output data packet to the virtual local area network identifier.

At block 1504, a virtual local area network tag is added to the first output data packet. At block 1506, the virtual local area network identifier is assigned to the virtual local area network tag of the first output data packet based on the requested external port.

At block 1508, a second output data packet, which is addressed to one of the external ports connected to a second connector device, is received from an application in the internal device. In the implementation of this embodiment in which the optional block 1326 was implemented during method 1300 as described above with reference to FIG. 14, the internal device translates the port identification in the second output data packet to the virtual local area network identifier.

At block 1510, a virtual local area network tag is added to the second output data packet. At block 1512, the virtual local area network identifier is assigned to the virtual local area network tag of the second output data packet based on the requested external port. At block 1514, the flow is directed to block 1516 of method 1500 in FIG. 16.

In FIG. 16 at block 1516, the first output data packet is received at the internal-coupling port of the first connector device. At block 1518, the first connector device is modified to switch the first output data packet to a paired external-coupling port based on the virtual local area network identifier. At block 1520, the first output data packet is received at the external-coupling port of the first connector device.

At block 1522, the virtual local area network identifier is extracted from the first output data packet. At block 1524, the virtual local area network tag is removed from the first output data packet. At block 1526, the first output data packet is received at the external port. At block 1528, the first output data packet is transmitted from the external port. At block 1530, the flow is directed to block 1532 of method 1500 in FIG. 17.

In FIG. 17 at block 1532, the second output data packet is received at the internal-coupling port of the second connector device. At block 1534, the second connector device is modified to switch the second output data packet to a paired external-coupling port based on the virtual local area network identifier. At block 1536, the second output data packet is received at the external-coupling port of the second connector device.

At block 1538, the virtual local area network identifier is extracted from the second output data packet. At block 1540, the virtual local area network tag is removed from the second output data packet. At block 1542, the second output data packet is received at the external port. At block 1544, the second output data packet is transmitted from the external port.

In one implementation of method 1500, the system 13 of FIG. 11 is implemented to pass the first and second data packets that are configured in a manner similar to the configuration of data packets 162 and 161 of FIG. 5A from the internal device 200 to one of the external ports 300-305. The method of outputting the first data packet from internal device 200 via the connector device 100 to the external ports 300-302 was described above with reference to method 900 of FIG. 9. In this implementation of method 1500, the second data packet is output from the internal device 200 via the connector device 400 to the external ports 303-305.

The internal processor 210 receives a second output data packet output from the application 251, 252, or 253 running on the internal processor 210. The second output data packet is configured in the same manner as data packet 162 shown in FIG. 5, from the application 251, 252, or 253 (block 1508). The second data packet 162 is addressed to one of the external ports, such as external port 303, 304 or 305, from an application, such as application 251, 252 or 253, in the internal device. The internal processor 210 executing software 230 adds a virtual local area network tag, such as Port VLAN tag 187, to the second output data packet (block 1510). Now the second output data packet is configured in the same manner as data packet 161 as shown in FIG. 5. The internal processor 210 executing software 230 assigns the virtual local area network identifier to the virtual local area network tag of the second data packet 161 based on the requested external port 303, 304 or 305 (block 1512). For example, if the data packet 161 is to be sent to the external port 303, which has the external port identifier 3, the VLAN ID 4 is assigned as the virtual local area network identifier in the tag control information of the Port VLAN tag 187 in the output data packet 161 (FIG. 5). The assignment is made using TABLE 7, as shown above. Likewise, if the data packet 161 is to be sent to the external port 305, which has the external port identifier 5, the VLAN ID 5 is assigned as the virtual local area network identifier in the tag control information of the Port VLAN tag 187 in the second output data packet 161 based on TABLE 7.

The processor 410 receives the second output data packet 161 at the connector device 400 (block 1532 of FIG. 17). The processor 410 executing software 430 modifies the connector device 400 to switch the second output data packet 161 to a paired external-coupling port 303, 304, or 305 based on the virtual local area network identifier (block 1534). The second output data packet 161 is received at the external-coupling port 450, 451 or 452 of the second connector device 400 (block 1536). The processor 410 executing software 430 removes the port VLAN tag 187 (block 1538) from the second output data packet 161. Now the second output data packet is configured in the same manner as data packet 162 that was received during block 1508 (FIG. 15). The processor 410 executing software 430 extracts the virtual local area network identifier from the second output data packet (block 1540). In one implementation of this embodiment, the virtual local area network identifier is extracted from the tag control information of the port VLAN tag 187. The processor 410 receives the second output data packet 162 at the external port 303, 304, or 305 (block 1542). The processor 410 executing software 430 transmits the second output data packet 162 from the external port 303, 304, or 305 (block 1544). The second output data packet 162 transmitted from the external port 303, 304, or 305 is configured identically to the data packet output from the application 251, 252, or 253 running on the internal processor 210. Thus the addition of the VLAN tag 187 during passage of the second data packet through the connector device 400 is transparent to the external ports 300, 301 or 302 that receive the data packet 162 from the external-coupling port 150, 151, or 152.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A program product comprising non-transitory program instructions, embodied on a storage medium, that are operable to cause a processor in a connector device to:
   switch input data packets for ingress to at least one internal-device port of an internal device from all external ports using virtual local area network identifiers and port virtual local area network tags, the port virtual local area network tags being added to the ingressing data packet upon input to the connector device, wherein the ingressing input data packets are switched through the connector device independent of a source address and a destination address of the input data packet; and the program instructions being further operable to cause an internal processor in the internal device to:
   switch output data packets for egress from the internal-device ports of the internal device using the virtual local area network identifiers and the port virtual local area network tags, the port virtual local area network tags being added to the egressing data packet at the internal device prior to being sent to the connector device, wherein the egressing output data packets are switched independent of a source address and a destination address of the egressing output data packet, and wherein there are more external ports than internal-device ports, and wherein applications in the internal device have visibility to all external ports.

2. The program product of claim 1, wherein the non-transitory program instructions operable to switch input data packets for ingress cause the processor in the connector device to:
   receive a data packet at an external-coupling port associated with one of the external ports;
   add a port virtual local area network tag to the received data packet;
   assign the virtual local area network identifier to the port virtual local area network tag, the value of the virtual local area network identifier assigned to the port virtual local area network tag being based on the external-coupling port that received the data packet, the port virtual local area network tag and assigned virtual local area network identifier being independent of the source address and the destination address; and
   modify the connector device to switch the modified data packet to a paired internal-coupling port based on the virtual local area network identifier.

3. The program product of claim 2, wherein the non-transitory program instructions operable to switch input data packets for ingress further cause the internal processor to:
   receive the data packet at the internal device;
   extract the virtual local area network identifier;
   remove the port virtual local area network tag; and
   pass the data packet to one of the applications.

4. The program product of claim 2, wherein the non-transitory program instructions operable to switch input data packets for ingress further cause the processor in the connector device to translate the virtual local area network identifier to a port identification.

5. The program product of claim 1, wherein the non-transitory program instructions operable to switch output data packets for egress cause the internal processor to:
   receive the output data packet addressed to one of the external ports from an application in the internal device;
   add a port virtual local area network tag to the output data packet; and assign the virtual local area network identifier to the port virtual local area network tag based on the requested external port, the port virtual local area network tag and assigned virtual local area network identifier being independent of the source address and the destination address.

6. The program product of claim 5, wherein the non-transitory program instructions operable to switch output data packets for egress further cause the processor in the connector device to:
receive the output data packet at the connector device;
modify the connector device to switch the output data packet to a paired external-coupling port based on the virtual local area network identifier;
receive the output data packet at the external-coupling port;
extract the virtual local area network identifier;
remove the port virtual local area network tag;
receive the output data packet at the external port; and
transmit the output data packet from the external port.

7. The program product of claim 6, wherein the non-transitory program instructions operable to switch output data packets for egress further cause the processor in the connector device to translate a port identification to the virtual local area network identifier.

8. A connector device comprising:
external-coupling ports communicatively coupled with external ports;
internal-coupling ports communicatively coupled with internal-device ports, wherein a virtual local area network identifier identifies a paired external-coupling port and internal-coupling port, wherein at least one internal-coupling port is paired with more than one external-coupling port;
a processor adapted to execute software to direct data packets between the internal-coupling ports and the external ports based on the virtual local area network identifier in a port virtual local area network tag; and
a memory communicatively coupled to the processor, the memory storing a configuration table associating the virtual local area network identifier with the respective pair of external-coupling ports and internal-coupling ports and a mapping table associating each virtual local area network identifier to one of the external-coupling ports,
wherein the processor is further adapted to execute software to direct the data packets that are input to the connector device based on the configuration table and the mapping table, the directing being independent of a source address and a destination address of the data packets that are input to the connector device.

9. A system comprising:
a connector device having internal-coupling ports;
a processor in the connector device to execute software to switch data packets; and
an internal device communicatively coupled with the internal-coupling ports, wherein virtual local area network identifiers are used to switch the data packets between the internal device and external ports communicatively coupled to the connector device, the switching being independent of a source address and a destination address of the data packets, and wherein virtual local area network tags are used to transport port information between the internal device and the external, wherein the virtual local area network tags are added to ingressing data packets by the processor upon receipt at the connector device, and wherein the virtual local area network tags are added to egressing data packets prior to receipt at the connector device.

10. The system of claim 9, wherein the internal device comprises:
an internal processor to execute software to switch data packets;
an internal memory communicatively coupled to the internal processor; and
internal-device ports each communicatively coupled with one internal-coupling port, wherein the internal memory stores an internal configuration table associating the internal-device ports with at least one of the virtual local area network identifiers.

11. The system of claim 10, wherein the connector device comprises:
external-coupling ports communicatively coupled to one of the external ports; and
a memory storing a configuration table and a mapping table, the memory being communicatively coupled to the processor in the connector device;
wherein the configuration table associates each virtual local area network identifier with a paired external-coupling port and internal-coupling port,
wherein at least one internal-coupling port is paired with more than one external-coupling port, and wherein the mapping table associates each virtual local area network identifier to one of the external-coupling ports, and
wherein the processor directs the data packets input to the connector device to one of the external-coupling ports and the internal-coupling ports, the directing based on the input port, the virtual local area network identifier in the added virtual local area network tag, the configuration table, and the mapping table.

12. The system of claim 11, wherein the virtual local area network identifiers are assigned to a virtual local area network tag in the data packet.

13. The system of claim 12, wherein the virtual local area network tag is an Ethernet frame configured according to 802.1 Q standards.

14. A method to map external ports, the method comprising:
using virtual local area network identifiers and port virtual local area network tags to switch input data packets for ingress to all internal-device ports of an internal device from all external ports, the port virtual local area network tags being added to the ingressing data packet upon input to a connector device by executing software at a processor in the connector device, wherein the ingressing input data packets are switched independent of a source address and a destination address of the input data packets; and
using the virtual local area network identifiers and the port virtual local area network tags to switch output data packets for egress from all the internal-device ports of the internal device, the port virtual local area network tags being added to the egressing data packet at an internal device by executing software at an internal processor in the internal device, wherein the egressing output data packets are switched independent of a source address and a destination address of the egressing output data packets, wherein the internal processor in the internal devices adds the port virtual local area network tags prior to sending the egressing output data packet to the connector device, wherein there are more external ports than internal-device ports, and wherein applications in the internal device have visibility to all the external ports.

15. The method of claim 14, wherein switching input data packets for ingress comprises:
receiving a data packet at an external-coupling port associated with one of the external ports;
adding a port virtual local area network tag to the received data packet;
assigning the virtual local area network identifier to the port virtual local area network tag based on the external-coupling port that received the data packet; and
modifying the connector device to switch the modified data packet to a paired internal-coupling port based on the virtual local area network identifier.

16. The method of claim 15, wherein switching input data packets for ingress further comprises:
receiving the data packet at the internal device from an external device;
extracting the virtual local area network identifier;
removing the port virtual local area network tag; and
passing the data packet to one of the applications.

17. The method of claim 15, wherein switching input data packets for ingress further comprises translating the virtual local area network identifier to a port identification.

18. The method of claim 14, wherein switching output data packets for egress comprises:
receiving output data packet addressed to one of the external ports from an application in the internal device;
adding a port virtual local area network tag to the output data packet; and
assigning the virtual local area network identifier to the port virtual local area network tag based on the requested external port.

19. The method of claim 18, wherein switching output data packets for egress further comprises:
receiving the data packet at the connector device from the internal device;
modifying the connector device to switch the data packet to a paired external-coupling port based on the virtual local area network identifier;
receiving the data packet at the external-coupling port;
extracting the virtual local area network identifier;
removing the port virtual local area network tag;
receiving the data packet at the external port; and
transmitting the data packet from the external port.

20. A program product comprising non-transitory program instructions, embodied on a storage medium, that are operable to cause at least one processor in at least one respective connector device to:
switch input data packets for ingress to at least one internal-device port of an internal device from all external ports coupled to the at least one connector device using virtual local area network identifiers and port virtual local area network tags, the port virtual local area network tags being added to the ingressing data packet upon input to one of the connector devices, wherein the ingressing input data packets are switched independent of a source address and a destination address of the ingressing input data packet; and
the program instructions being further operable to cause an internal processor that is in an internal device to:
switch output data packets for egress from the internal-device ports of the internal device using the virtual local area network identifiers and the virtual local area network tags, the port virtual local area network tags being added to the egressing data packet at the internal device prior to being received at one of the connector devices, wherein the egressing output data packets are switched independent of a source address and a destination address of the egressing output data packet, and wherein there are more external ports than internal-device ports, and wherein applications in the internal device have visibility to all external ports coupled to the connector devices.

21. The program product of claim 20, wherein the non-transitory program instructions operable to switch input data packets for ingress cause a processor in a first connector device to:
receive a first data packet at an external-coupling port of the first connector device associated with one of the external ports;
add a port virtual local area network tag to the received first data packet;
assign the virtual local area network identifier to the port virtual local area network tag in the first data packet, the value of the virtual local area network identifier assigned to the port virtual local area network tag being based on the external-coupling port that received the first data packet;
modify the first connector device to switch the modified first data packet to a paired internal-coupling port based on the virtual local area network identifier; and
wherein the instructions operable to switch input data packets for ingress cause a processor in a second connector device to:
receive a second data packet at an external-coupling port of the second connector device associated with one of the external ports;
add a port virtual local area network tag to the received second data packet;
assign the virtual local area network identifier to the port virtual local area network tag in the second data packet, the value of the virtual local area network identifier assigned to the port virtual local area network tag being based on the external-coupling port that received the second data packet; and
modify the second connector device to switch the modified second data packet to a paired internal-coupling port based on the virtual local area network identifier.

22. The program product of claim 21, wherein the non-transitory program instructions operable to provide the first input data packet and the second input data packet for ingress further cause the internal processor in the internal device to:
receive the first data packet and the second data packet at the internal device;
extract the virtual local area network identifier from the first data packet and the second data packet;
remove the port virtual local area network tag from the first data packet and the second data packet; and
pass the first data packet and the second data packet to at least one of the applications.

23. The program product of claim 22, wherein the non-transitory program instructions operable to provide the first data packet and the second data packet for ingress further cause the processors in the first connector device and the second connector device to translate the virtual local area network identifier to a port identification.

24. The program product of claim 20, wherein the non-transitory program instructions operable to switch output data packets for egress cause the internal processor to:
receive a first output data packet addressed to one of the external ports connected to a first connector device from an application in the internal device;

add a port virtual local area network tag to the first output data packet;

assign the virtual local area network identifier to the port virtual local area network tag based on the requested external port;

receive a second output data packet addressed to one of the external ports connected to a second connector device from an application in the internal device;

add a port virtual local area network tag to the second output data packet; and assign the virtual local area network identifier to the port virtual local area network tag based on the requested external port.

25. The program product of claim 24, wherein the non-transitory program instructions operable to provide the first output data packet for egress further cause a first processor in the first connector device to:

receive the first output data packet at an internal-coupling port of the first connector device from the internal device;

modify the first connector device to switch the first data packet to a paired external-coupling port based on the virtual local area network identifier;

extract the virtual local area network identifier from the virtual local area network tag of the first data packet;

remove the port virtual local area network tag from the first data packet;

receive the first output data packet at the external-coupling port of the first connector device;

transmit the first output data packet and from the external port of the first connector device;

and wherein the instructions operable to provide the second output data packet for egress further cause the second processor in the second connector device to:

receive the second output data packet at an internal-coupling port of the second connector device from the internal device;

modify the second connector device to switch the second data packet to a paired external-coupling port based on the virtual local area network identifier;

extract the virtual local area network identifier from the virtual local area network tag of the second data packet;

remove the port virtual local area network tag from the second data packet;

receive the second output data packet at the external-coupling port of the second connector device; and transmit the second output data packet from the external port of the second connector device.

26. A plurality of connector devices each connector device comprising:

external-coupling ports communicatively coupled with external ports;

internal-coupling ports communicatively coupled with internal-device ports of an internal device, wherein a virtual local area network identifier identifies a paired external-coupling port and internal-coupling port, wherein at least one internal-coupling port is paired with more than one external-coupling port;

a processor adapted to execute software to direct data packets between the internal-coupling ports and the external ports based on the virtual local area network identifier in a port virtual local area network tag; and a memory communicatively coupled to the processor, the memory storing a configuration table associating the virtual local area network identifier with the respective pair of external-coupling ports and internal-coupling ports and a mapping table associating each virtual local area network identifier to one of the external-coupling ports, wherein the processor is further adapted to execute software to direct the data packets that are input to the plurality of connector devices based on the configuration table and the mapping table, wherein the data packets are directed independent of a source address and a destination address of the ingressing input data packet.

27. A system comprising:

a plurality of connector devices having internal-coupling ports;

an internal device communicatively coupled with the internal-coupling ports of the plurality of connector devices; and an internal processor in the internal device adapted to execute software to switch data packets, wherein virtual local area network identifiers are used to switch the data packets between the internal device and external ports communicatively coupled to the plurality of connector devices, and wherein virtual local area network tags are used to transport port information between the internal device and the external ports, wherein, upon receipt at one of the plurality of connector devices, a processor in the receiving connector device is adapted to execute software to add virtual local area network tags to ingressing data packets, and wherein the internal processor in the internal devices adds the virtual local area network tags to egressing data packets prior to sending the egressing data packet to one of the plurality of connector devices, and wherein the egressing output data packets are switched independent of a source address and a destination address of the egressing output data packet.

28. The system of claim 27, wherein the internal device comprises:

an internal memory communicatively coupled to the internal processor; and internal-device ports each communicatively coupled with one internal-coupling port from each connector device, wherein the internal memory stores an internal configuration table associating the internal-device ports with at least one of the virtual local area network identifiers.

29. The system of claim 28, wherein each connector device comprises:

external-coupling ports communicatively coupled to one of the external ports;

a memory storing a configuration table and a mapping table; and a processor communicatively coupled to the memory, wherein the configuration table associates each virtual local area network identifier with a paired external-coupling port and internal-coupling port, wherein at least one internal-coupling port is paired with more than one external-coupling port, and wherein the mapping table associates each virtual local area network identifier to one of the external-coupling ports, and wherein the processor executes software to directs the data packets input to each connector device to one of the external-coupling ports and the internal-coupling ports, the directing based on the input port, the virtual local area network identifier, the configuration table and the mapping table.

30. The system of claim 29, wherein the virtual local area network identifiers are assigned to a virtual local area network tag in the data packet.

31. The system of claim 30, wherein the virtual local area network tag in an Ethernet frame configured according to 802.1Q standards.

32. A method to map external ports, the method comprising:
switching input data packets for ingress to at least one internal-device port of an internal device from all external ports coupled to a plurality of connector devices using virtual local area network identifiers and port virtual local area network tags, the port virtual local area network tags being added to the ingressing data packets by a processor executing software, the processor located in a respective one of the plurality of connector devices, wherein the port virtual local area network tags are added upon input of the input data packets to one of the plurality of connector devices, and wherein the ingressing input data packets are switched independent of a source address and a destination address of the ingressing input data packet; and
switching output data packets for egress from all the internal-device ports of the internal device using the virtual local area network identifiers and the port virtual local area network tags, the port virtual local area network tags being added to the egressing data packets by an internal processor executing software, the internal processor located in the internal device, wherein the port virtual local area network tags are added to the egressing data packets prior to the egressing data packets being received at one of the plurality of connector devices, wherein the egressing output data packets are switched independent of a source address and a destination address of the egressing output data packet, wherein there are more external ports than internal-device ports, and wherein applications in the internal device have visibility to all the external ports coupled to the plurality of connector devices.

33. The method of claim 32, wherein switching input data packets for ingress comprises:
receiving a first data packet at an external-coupling port of a first connector device associated with one of the external ports;
adding a port virtual local area network tag to the received first data packet;
assigning the virtual local area network identifier to the port virtual local area network tag, the value of the virtual local area network identifier assigned to the port virtual local area network tag being based on the external-coupling port that received the first data packet;
modifying the first connector device by the processor in the first connector device to switch the modified first data packet to a paired internal-coupling port based on the virtual local area network identifier;
receiving a second data packet at an external-coupling port of a second connector device associated with one of the external ports;
adding a port virtual local area network tag to the received second data packet;
assigning the virtual local area network identifier to the port virtual local area network tag, the value of the virtual local area network identifier assigned to the port virtual local area network tag being based on the external-coupling port that received the second data packet; and
modifying the second connector device by the processor in the second connector device to switch the modified second data packet to a paired internal-coupling port based on the virtual local area network identifier.

34. The method of claim 33, wherein switching input data packets for ingress further comprises:
receiving the first data packet and the second data packet at the internal device;
extracting the virtual local area network identifier from the first data packet and the second data packet by the internal processor;
removing the port virtual local area network tag from the first data packet and the second data packet by the internal processor; and
passing the first data packet and the second data packet to at least one of the applications.

35. The method of claim 33, wherein switching input data packets for ingress further comprises translating the virtual local area network identifier to a port identification.

36. The method of claim 32, wherein switching output data packets for egress comprises:
receiving a first output data packet addressed to one of the external ports connected to a first connector device from an application in the internal device;
adding a port virtual local area network tag to the first output data packet; and
assigning the virtual local area network identifier to the port virtual local area network based on the requested external port.

37. The method of claim 36, wherein switching output data packets for egress further comprises:
receiving the first output data packet at the internal-coupling port of the first connector device;
modifying the first connector device to switch the first output data packet to a paired external-coupling port based on the virtual local area network identifier;
receiving the first output data packet at the external-coupling port of the first connector device;
extracting the virtual local area network identifier from the first output data packet;
removing the port virtual local area network tag from the first output data packet;
receiving the first output data packet at the external port;
transmitting the first output data packet from the external port;
receiving the second output data packet at the internal-coupling port of the second connector device;
modifying the second connector device to switch the second output data packet to a paired external-coupling port based on the virtual local area network identifier;
receiving the second output data packet at the external-coupling port of the second connector device;
extracting the virtual local area network identifier from the second output data packet;
removing the port virtual local area network tag from the second output data packet;
receiving the second output data packet at the external port; and
transmitting the second output data packet from the external port.

38. A method to switch data packets within a connector device, the method comprising:
adding a port virtual local area network tag to an ingressing data packet upon input to an external port of the connector device;
assigning a virtual local area network identifier to the port virtual local area network tag of the ingressing data packets, the port virtual local area network tag and assigned virtual local area network identifier being independent of the source address and the destination address of the ingressing data packets;

switching the ingressing data packets for ingress to one of a plurality of internal-device ports of an internal device from the external port based on the assigned port virtual local area network tags, wherein the ingressing input data packets are switched independent of a source address and a destination address of the ingressing input data packet;

adding a port virtual local area network tag to an egressing data packet upon input to an internal device;

assigning a virtual local area network identifier to the port virtual local area network tag of the egressing data packet, the port virtual local area network tag and assigned virtual local area network identifier being independent of the source address and the destination address of the egressing data packet; and switching the output data packets for egress from all the internal-device ports of the internal, wherein the egressing output data packets are switched independent of a source address and a destination address of the egressing output data packet, and wherein applications in the internal device have visibility to all the external ports.

39. A program product comprising non-transitory program instructions, embodied on a storage medium, that are operable to cause a processor in a connector device to:

switch input data packets for ingress to at least one internal-device port of an internal device from all external ports using virtual local area network identifiers and port virtual local area network tags, wherein the input data packets are switched independent of a source address and a destination address of the ingressing input data packet; and switch output data packets for egress from the internal-device ports of the internal device using the virtual local area network identifiers and the port virtual local area network tags, wherein the port virtual local area network tags and virtual local area network identifiers are independent of the source address and the destination address of the ingressing data packets and the egressing data packets, wherein the egressing output data packets are switched independent of a source address and a destination address of the egressing output data packet, wherein there are more external ports than internal-device ports, and wherein applications in the internal device have visibility to all external ports.

* * * * *